United States Patent [19]
Suzuki et al.

[11] Patent Number: 5,699,474
[45] Date of Patent: Dec. 16, 1997

[54] METHOD AND APPARATUS FOR DECODING MPEG-TYPE DATA REPRODUCED FROM A RECORDING MEDIUM DURING A HIGH-SPEED REPRODUCTION OPERATION

[75] Inventors: Teruhiko Suzuki, Chiba; Katsumi Tahara, Kanagawa; Yoichi Yagasaki, Tokyo; Yasushi Fujinami; Jun Yonemitsu, both of Kanagawa, all of Japan

[73] Assignee: Sony Corporation, Tokyo, Japan

[21] Appl. No.: 397,116
[22] PCT Filed: Jul. 12, 1994
[86] PCT No.: PCT/JP94/01139
§ 371 Date: Jun. 19, 1995
§ 102(e) Date: Jun. 19, 1995
[87] PCT Pub. No.: WO95/02946
PCT Pub. Date: Jan. 26, 1995

[30] Foreign Application Priority Data

Jul. 12, 1993 [JP] Japan .................. P5-171920

[51] Int. Cl.[6] ............................................. H04N 5/92
[52] U.S. Cl. ................. 386/68; 356/111; 356/112
[58] Field of Search .................. 386/68, 46, 54, 386/96, 111, 112, 109, 125, 124, 98, 95; 360/32, 33.1; 348/423, 403, 410; H04N 5/92

[56] References Cited

U.S. PATENT DOCUMENTS

| | | |
|---|---|---|
| 4,931,879 | 6/1990 | Koga et al. .................. 386/68 |
| 5,191,436 | 3/1993 | Yonemisu .................. 386/46 |
| 5,225,904 | 7/1993 | Golin et al. .................. 348/410 |
| 5,231,492 | 7/1993 | Dangi et al. .................. 348/423 |
| 5,450,209 | 9/1995 | Niimura et al. .................. 386/68 |

FOREIGN PATENT DOCUMENTS

| | | |
|---|---|---|
| 0 627 853 | 12/1991 | European Pat. Off. . |
| 0 505 985 | 9/1992 | European Pat. Off. . |
| 0 546 865 | 6/1993 | European Pat. Off. . |
| 0 617 559 | 9/1994 | European Pat. Off. . |

*Primary Examiner*—Thai Tran
*Assistant Examiner*—Huy Nguyen
*Attorney, Agent, or Firm*—William S. Frommer; Alvin Sinderbrand

[57] ABSTRACT

Recording unit is operative so that, in the case of carrying out high speed reproduction, switch is switched by high speed reproduction control signal inputted from the external, and a signal read out from the recording unit is inputted to VLD and formatter. High speed reproduction control signal is inputted to recording unit, switch and counter. Recording unit reproduces and outputs predetermined data in accordance with high speed reproduction control signal. At VLD, variable length encoding of MPEG is released, and syntax analysis is carried out. Counter counts the number of frames to be transmitted. Moreover, counter outputs temporal__ reference in accordance with reproduction speed indicated by high speed reproduction control signal. Header converter rewrites temporal__reference in picture header in accordance with temporal__reference outputted from counter. From facts as described above, high speed reproduction of moving picture can be made.

36 Claims, 28 Drawing Sheets

```
SEQUENCE() {
        SEQUENCE_HEADER_CODE                     32 BIT   BSLBF
        HORIZONTAL_SIZE_VALUE                    12       UIMSBF
        VERTICAL_SIZE_VALUE                      12       UIMSBF
        PEL_ASPECT_RATIO                         4        UIMSBF
        FRAME_RATE                               4        UIMSBF
        BIT_RATE                                 18       UIMSBF
        MARKER_BIT                               1        "1"
        VBV_BUFFER_SIZE                          10       UIMSBF
        CONSTRAINED_PARAMETER_FLAG               1
        LOAD_INTRA_QUANTIZER_MATRIX              1
        IF(LOAD_INTRA_QUANTIZER_MATRIX)
            INTRA_QUANTIZER_MATRIX[64]           8*64     UIMSBF
        LOAD_NON_INTRA_QUANTIZER_MATRIX          1
        IF(LOAD_NON_INTRA_QUANTIZER_MATRIX)
            NON_INTRA_QUANTIZER_MATRIX[64]       8*64     UIMSBF
|       FF_SEQUENCE                              1
        NEXT_START_CODE()
}
```

FIG.13

```
SLICE(){
        SLICE_START_CODE                         32BIT   BSLBF
        QUANTIZER_SCALE                          5       UIMSBF
    |   IF(FF_SEQUENCE_) {
    |       EXTRA_BIT_SLICE                      1
    |       SLICE_TYPE                           1
    |       IF(SLICE_TYPE==1) {
    |           PICTURE_CODING_TYPE              3
    |           INTRA_DC_PRECISION               2
    |           PICTURE_STRUCTURE                2
    |           Q_SCALE_TYPE                     1
    |           INTRA_VLC_FORMAT                 1
    |           ALTERNATE_SCAN                   1
    |       }
    |   }

WHILE(NEXTBITS()=='1') {                 1
            EXTRA_BIT_SLICE                      8
            EXTRA_INFORAMTION_SLICE
        }                                        1
        EXTRA_BIT_SLICE

DO {
          MACROBLOCK()
        }WHILE(NEXTBITS()!='000 0000 0000 0000 0000 0000')
        NEXT_START_CODE()
}
```

FIG.15

6.2.2 VIDEO SEQUENCE

| VIDEO_SEQUENCE() { | NO. OF BITS | MNEMONIC |
|---|---|---|
| NEXT_START_CODE() | | |
| SEQUENCE_HEADER() | | |
| IF(NEXTBITS()==EXTENSION_START_CODE){ | | |
|     SEQUENCE_EXTENSION() | | |
|     DO{ | | |
|         EXTENSION_AND_USER_DATA(0) | | |
|         DO{ | | |
|             IF(NEXT_BITS()==GROUP_START_CODE){ | | |
|                 GROUP_OF_PICTURES_HEADER() | | |
|                 EXTENSION_AND_USER_DATA(1) | | |
|             } | | |
|             PICTURE_HEADER() | | |
|             EXTENSIONS_AND_USER_DATA(2) | | |
|             PICTURE_DATA() | | |
|         }WHILE((NEXT_BITS()==PICTURE_START_CODE)\|\| | | |
|             NEXT_BITS()==GROUP_START_CODE)) | | |
|         IF(NEXTBITS()!=SEQUENCE_END_CODE){ | | |
|             SEQUENCE_HEADER() | | |
|             SEQUENCE_EXTENSION() | | |
|         } | | |
|     }WHILE(NEXTBITS()!=SEQUENCE_END_CODE) | | |
| }ELSE{ | | |
|     DO{ | | |
|         DO{ | | |
|             GROUP_OF_PICTURES_HEADER() | | |
|             IF(NEXT_BITS()==USER_DATA_START_CODE) | | |
|                 USER_DATA() | | |
|         DO{ | | |
|             PICTURE_HEADER() | | |
|             IF(NEXT_BITS()==USER_DATA_START_CODE) | | |
|                 USER_DATA() | | |
|             PICTURE_DATA() | | |
|         }WHILE(NEXT_BITS()==PICTURE_START_CODE) | | |
|     }WHILE(NEXT_BITS()==GROUP_START_CODE) | | |
|     IF(NEXTBITS()!=SEQUENCE_END_CODE) | | |
|         SEQUENCE_HEADER() | | |
|     }WHILE(NEXT_BITS()!=SEQUENCE_END_CODE) | | |
| } | | |
| SEQUENCE_END_CODE | | |
| } | | |

FIG.18

6.2.3 SEQUENCE HEADER

| SEQUENCE_HEADER(){ | NO. OF BITS | MNEMONIC |
|---|---|---|
| SEQUENCE_HEADER_CODE | 32 | BSLBF |
| HORIZONTAL_SIZE_VALUE | 12 | UIMSBF |
| VERTICAL_SIZE_VALUE | 12 | UIMSBF |
| PEL_ASPECT_RATIO | 4 | UIMSBF |
| FRAME_RATE | 4 | UIMSBF |
| BIT_RATE | 16 | UIMSBF |
| MARKET_BIT | 1 | "1" |
| VBV_BUFFER_SIZE | 10 | UIMSBF |
| CONSTRAINED_PARAMETER_FLAG | 1 | |
| LOAD_INTRA_QUANTIZER_MATRIX | 1 | |
| IF(LOAD_INTRA_QUANTIZER_MATRIX) | | |
| INTRA_QUANTIZER_MATRIX[64] | 8*64 | UIMSBF |
| LOAD_NON_INTRA_QUANTIZER_MATRIX | 1 | |
| IF(LOAD_NON_INTRA_QUANTIZER_MATRIX) | | |
| NON_INTRA_QUANTIZER_MATRIX[64] | 8*64 | UIMSBF |
| NEXT_START_CODE() | | |

SEQUENCE EXTENSION

| SEQUENCE_EXTENSION(){ | NO. OF BITS | MNEMONIC |
|---|---|---|
| EXTENSION_START_CODE | 32 | BSLBF |
| EXTENSION_START_CODE_IDENTIFIER | 4 | UIMSBF |
| PROFILE_AND_LEVEL_INDICATION | 8 | UIMSBF |
| NON_INTERLACED_SEQUENCE | 1 | UIMSBF |
| CHROMA_FORMAT | 2 | UIMSBF |
| HORIZONTAL_SIZE_EXTENSION | 2 | UIMSBF |
| VERTICAL-SIZE_EXTENSION | 2 | UIMSBF |
| BIT_RATE_EXTENSION | 12 | UIMSBF |
| MARKER | 1 | |
| VBV_BUFFER_SIZE_EXTENSION | 5 | UIMSBF |
| FRAME_RATE_EXTENSION | 8 | UIMSBF |
| NEXT_START_CODE() | | |
| } | | |

NOTE: THE FLAGS ABOVE ARE USUALLY ZERO. HOWEVER IF MANY MORE ARE ADDED THEN ATTENTION MUST BE PAID TO START-CODE EMULATION.

FIG.19

QUANT MATRIX

| QUANT_MATRIX_EXTENSION(){ | NO. OF BITS | MNEMONIC |
|---|---|---|
| EXTENSION_START_CODE | 32 | BSLBF |
| EXTENSION_START_CODE_IDENTIFIER | 4 | UIMSBF |
| LOAD_INTRA_QUENTIZER_MATRIX | 1 | UIMSBF |
| IF(LOAD_INTRA_QUANTIZER_MATRIX) | | |
| INTRA_QUANTIZER_MATRIX[64] | 8*64 | UIMSBF |
| LOAD_NON_INTRA_QUANTIZER_MATRIX | 1 | UIMSBF |
| IF(LOAD_NON_INTRA_QUANTIZER_MATRIX) | | |
| NON_INTRA_QUANTIZER_MATRIX[64] | 8*64 | UIMSBF |
| LOAD_CHROMA_INTRA_QUANTIZER_MATRIX | 1 | 0 |
| LOAD_CHROMA_NON_INTRA_QUANTIZER_MATRIX | 1 | 0 |
| NEXT_START_CODE() | | |
| } | | |

6.2.4 GROUP OF PICTURE HEADER

| GROUP_OF_PICTURES_HEADER(){ | NO. OF BITS | MNEMONIC |
|---|---|---|
| GROUP_START_CODE | 32 | BSLBF |
| TIME_CODE | 25 | |
| CLOSED_GOP | 1 | |
| BROKEN_LINK | 1 | |
| NEXT_START_CODE() | | |
| } | | |

FIG.20

6.2.5 PICTURE HEADER

| PICTURE_HEADER(){ | NO.OF BITS | MNEMONIC |
|---|---|---|
| PICTURE_START_CODE | 32 | BSLBF |
| TEMPORAL_REFERENCE | 10 | UIMSBF |
| PICTURE_CODING_TYPE | 3 | UIMSBF |
| VBV_DELAY | 16 | UIMSBF |
| IF(PICTURE_CODING_TYPE==2‖PICTURE_CODING_TYPE==3){ | | |
| FULL_PEL_FORWARD_VECTOR | 1 | |
| FORWARD_F_CODE | 3 | UIMSBF |
| -} | | |
| IF(PICTURE_CODING_TYPE==3){ | | |
| FULL_PEL_BACKWARD_VECTOR | 1 | |
| BACKWARD_F_CODE | 3 | UIMSBF |
| } | | |
| WHILE(NEXTBITS()=='1'){ | | |
| EXTRA_BIT_PICTURE | 1 | "1" |
| EXTRA_INFORMATION_PICTURE | 3 | |
| } | | |
| EXTRA_BIT_PICTURE<br>NEXT_START_CODE() | 1 | "0" |
| } | | |

FIG.21

| PICTURE_CODING_EXTENSION(){ | NO. OF BITS | MNEMONIC |
|---|---|---|
| EXTENSION_START_CODE | 32 | BSIBF |
| EXTENSION_ID | 4 | UIMSBF |
| FORWARD_HORIZONTAL_F_CODE | 4 | UIMSBF |
| FORWARD_VERTICAL_F_CODE | 4 | UIMSBF |
| BACKWARD_HORIZONTAL_F_CODE | 4 | UIMSBF |
| BACKWARD_VERTICAL_F_CODE | 4 | UIMSBF |
| INTRA_DC_PRECISION | 2 | UIMSBF |
| PICTURE_STRUCTURE | 2 | UIMSBF |
| TOP_FIELD_FIRST | 1 | UIMSBF |
| FRAME_PRED_FRAME_DCT | 1 | UIMSBF |
| CONCEALMEMT MOTION VECTORS | 1 | UIMSBF |
| Q_SCALE_TYPE | 1 | UIMSBF |
| INTRA_VLC_FORMAT | 1 | UIMSBF |
| ALTERNATE_SCAN | 1 | UIMSBF |
| NUMBER_OF_FIRLD_DISPLAYED_CODE | 1 | UIMSBF |
| CHROMA_POSTPROCESSING_TYPE | 1 | UIMSBF |
| NON_INTERLACED_FRAME | 1 | UIMSBF |
| COMPOSITE_DISPLAY_FLAG | 1 | UIMSBF |
| IF(COMPOSITE_DISPLAY_FLAG){ | | |
|     V-AXIS | 1 | UIMSBF |
|     FIELD_SEQUENCE | 3 | UIMSBF |
|     SUB_CARRIER | 1 | |
|     BURST_AMPLITUDE | 7 | UIMSBF |
|     SUB_CARRIER_PHASE | 8 | UIMSBF |
| } | | |
| NEXT_START_CODE() | | |
| } | | |

FRAME_PRED_FRAME_DCT IS 1 INDICATES THAT THE DCT IS FRAME BASED
AND THE PREDICTION IS FRAMES BASED AND THE PREDICTION IS 16x16
(AS IN MPEG-1).0 ENABLES ALL OF THE FIELD DCT, FIELD PRED AND DUAL PRIME.

FIG.22

6.2.6 SLICE LAYER

| SLICE(){ | NO. OF BITS | MNEMONIC |
|---|---|---|
| SLICE_START_CODE | 32 | BSLBF |
| QUANTIZER_SCALE_CODE | 5 | UIMSBF |
| WHILE(NEXTBITS()=='1'){ | | |
|     EXTRA_BIT_SLICE | 1 | "1" |
|     EXTRA_INFORMATION_SLICE | 8 | |
| } | | |
| EXTRA_BIT_SLICE | 1 | "0" |
| DO{ | | |
|     MACROBLOCK() | | |
| }WHILE(NEXTBITS()!= '000 0000 0000 0000 0000 0000') | | |
| NEXT_START_CODE() | | |
| } | | |

FIG.23

6.2.7 MACROBLOCK LAYER

| MACROBLOCK(){ | NO. OF BITS | MNEMONIC |
|---|---|---|
| IF(<SEQUENCE EXTENSION WAS NOT PRESENT>) | | |
| WHILE(NEXTBITS()=='0000 0001 111') | | |
| MACROBLOCK_STUFFING | 11 | VLCLBF |
| WHILE(NEXTBITS()=='0000 0001 000') | | |
| MACROBLOCK_ESCAPE | 11 | VLCLBF |
| MACROBLOCK_ADDRESS_INCREMENT | 1-11 | VLCLBF |
| MACROBLOCK_TYPE | 1-8 | VLCLBF |
| IF(MACROBLOCK_MOTION_FORWARD\|\| | | |
| MACROBLOCK_MOTION_BACKWARD) { | | |
| IF(PICTURE_STRUCTURE==FRAME) { | | |
| IF(FRAME_PRED_FRAME_DCT=0) | | |
| FRAME_MOTION_TYPE | 2 | UIMSBF |
| }ELSE{ | | |
| FIELD_MOTION_TYPE | 2 | UIMSBF |
| } | | |
| } | | |
| IF((PICTURE_STRUCTURE==FRAME)&& | | |
| (FRAME_PRED_FRAME_DCT==0)&& | | |
| (MACROBLOCK_INTRA \|\| MACROBLOCK_PATTERN)) | | |
| DCT_TYPE | 1 | UIMSBF |
| IF(MACROBLOCK_QUANT) | | |
| QUANTIZER_SCALE_CODE | 5 | UIMSBF |
| IF(MACROBLOCK_MOTION_FORWARD\|\| | | |
| (MACROBLOCK_INTRA&&CONCEALMENT_MOTION_VECTORS)) | | |
| FORWARD_MOTION_VECTORS() | ... | ... |
| IF(MACROBLOCK_MOTION_BACKWARD) | | |
| BACKWARD_MOTION_VECTORS | ... | ... |
| IF(MACROBLOCK_INTRA&&CONCEALMENT_MOTION_VECTORS) | | |
| MARKER_BIT | 1 | |
| IF(MACROBLOCK_PATTERN) | | |
| CODED_BLOCK_PATTERN() | ... | ... |
| FOR(I=0;I<BLOCK_COUNT;I++){ | | |
| BLOCK(I) | | |
| } | | |
| IF(PICTURE_CODING_TYPE==4) | | |
| END_OF_MACROBLOCK | 1 | "1" |
| } | | |

FIG.24

| MOTION_VECTORS(){ | NO.OF BITS | MNEMONIC |
|---|---|---|
| IF(MOTION_VECTOR_COUNT==1){ | | |
| IF(MV_FORMAT==FRAME){ | | |
| MOTION_VECTOR() | ... | ... |
| }ELSE{ | | |
| FIELD_MOTION_VECTOR() | ... | ... |
| } | ... | ... |
| }ELSE{ | | |
| FIELD_MOTION_VECTOR() | ... | ... |
| FIRLD_MOTION_VECTOR() | ... | ... |
| } | | |
| } | | |

| MOTION_VECTOR(){ | NO.OF BITS | MNEMONIC |
|---|---|---|
| MOTION_HORIZONRAL_CODE | 1-13 | VLCLBF |
| IF((HORIZONTAL_F!=1)&&(MOTION_HORIZONTAL_CODE!=0)) | | |
| MOTION HORIZONTAL_R | 1-8 | UIMSBF |
| IF(DMV==1) | | |
| DMV_HORIZONTAL | 1-2 | VLCBF |
| MOTION_VERICAL_CODE | 1-13 | VLCLBF |
| IF((VERTICAL_F!=1)&&(MOTION_VERTICAL_CODE!=0)) | | |
| MOTION_VERTICAL_R | 1-8 | UIMSBF |
| IF(DMV==1) | | |
| DMV_VERTICAL | 1-2 | VLCBF |
| } | | |

| FIELD_MOTION_VECTOR_(){ | NO.OF BITS | MNEMONIC |
|---|---|---|
| MOTION_VERTICAL_FIRLD_SELECT | 1 | UIMSBF |
| MOTION_VECTOR() | ... | ... |
| } | | |

| CODED_BLOCK_PATTERN(){ | NO.OF BITS | MNEMONIC |
|---|---|---|
| CODED_BLOCK_PATTERN_420 | 3-9 | VLCLBF |
| IF((CHROMA_FORMAT==4:4:4)|!(CHROMA_FORMAT==4:2:2)) | | |
| EXTENSION OF CODED BLOCK PATTERN | | |
| } | | |

FIG.25

TABLE 6-4···FRAME_RATE

| FRAME_RATE | FRAMES PER SECOND |
|---|---|
| 0000 | FORBIDDEN |
| 0001 | 23.976 |
| 0010 | 24 |
| 0011 | 25 |
| 0100 | 29.97 |
| 0101 | 30 |
| 0110 | 50 |
| 0111 | 59.94 |
| 1000 | 60 |
| ... | RESERVED |
| 1111 | RESERVED |

FIG.26

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG.27

| 16 | 16 | 16 | 16 | 16 | 16 | 16 | 16 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

FIG.28

| EXTENSION ID | NAME | FOLLOWS SEQUENCE HEADER (I=0) | FOLLOWS GOP HEADER (I=1) | FOLLOWS PICTURE HEADER (I=2) |
|---|---|---|---|---|
| 0000 | RESERVED | | | |
| 0001 | SEQUENCE EXTENSION | ALWAYS | | |
| 0010 | SEQUENCE DISPLAY | OPTIONAL | | |
| 0011 | QUANT MATRIX | OPTIONAL | | OPTIONAL |
| 0100 | SEQUENCE FREQUENCY | CONDITIONAL | | |
| 0101 | SEQUENCE SPATIAL | CONDITIONAL | | |
| 0110 | 10BIT INPUT ? | | | |
| 0111 | PICTURE PAN-SCAN | | | OPTIONAL |
| 1000 | PICTURE CODING | | | ALWAYS |
| 1001 | PICTURE SPATIAL | | | OPTIONAL |
| 1010 | FF/FR ???? | | | |
| 1011 | RESERVED | | | |
| ... | ... | | | |
| 1111 | RESERVED | | | |

FIG.29

TABLE 6-8···PICTURE_CODING_TYPE

| PICTURE_CODING_TYPE | CODING METHOD |
|---|---|
| 000 | FORBIDDEN |
| 001 | INTRA-CODED(I) |
| 010 | PRODICTIVE_CODED(P) |
| 011 | BIDIRECTIONALLY-PRODICTIVE-CODED(B) |
| 100 | DC INTRA-CODED(D) |
| 101 | RESERVED |
| 110 | RESERVED |
| 111 | RESERVED |

FIG.30

TABLE B-3···VARIBLE LENGTH CODES
FOR MACTOBLOCK_TYPE IN I-PICTURE

| MACROBLOCK_<br>TYPE<br>VLC CODE | MACROBLOCK_QUANT | MACROBLOCK_MOTION_FORWARD | MACROBLOCK_MOTION_BACKWARD | MACROBLOCK_PATTERN | MACROBLOCK_INTRA | MACROBLOCK_COMPATIBLE |
|---|---|---|---|---|---|---|
| 1 | 0 | 0 | 0 | 0 | 1 | 0 |
| 01 | 1 | 0 | 0 | 0 | 1 | 1 |

TABLE B-4···VARIBLE LENGTH CODES
FOR MACTOBLOCK_TYPE IN P-PICTURE

| MACROBLOCK_<br>TYPE<br>VLC CODE | MACROBLOCK_QUANT | MACROBLOCK_MOTION_FORWARD | MACROBLOCK_MOTION_BACKWARD | MACROBLOCK_PATTERN | MACROBLOCK_INTRA | MACROBLOCK_COMPATIBLE |
|---|---|---|---|---|---|---|
| 1 | 0 | 1 | 0 | 1 | 0 | 0 |
| 01 | 0 | 0 | 0 | 1 | 0 | 0 |
| 001 | 0 | 1 | 0 | 0 | 0 | 0 |
| 0001 1 | 0 | 0 | 0 | 0 | 1 | 0 |
| 0001 0 | 1 | 1 | 0 | 1 | 0 | 0 |
| 0000 1 | 1 | 0 | 0 | 1 | 0 | 0 |
| 0000 01 | 1 | 0 | 0 | 0 | 1 | 0 |

FIG.31

TABLE B-5···VARIBLE LENGTH CODES
FOR MACTOBLOCK_TYPE IN B-PICTURE

| MACROBLOCK_ TYPE VLC CODE | MACROBLOCK_QUANT | MACROBLOCK_MOTION_FORWARD | MACROBLOCK_MOTION_BACKWARD | MACROBLOCK_PATTERN | MACROBLOCK_INTRA | MACROBLOCK_COMPATIBLE |
|---|---|---|---|---|---|---|
| 10 | 0 | 1 | 1 | 0 | 0 | 0 |
| 11 | 0 | 1 | 1 | 1 | 0 | 0 |
| 010 | 0 | 0 | 1 | 0 | 0 | 0 |
| 011 | 0 | 0 | 1 | 1 | 0 | 0 |
| 0010 | 0 | 1 | 0 | 0 | 0 | 0 |
| 0011 | 0 | 1 | 0 | 1 | 0 | 0 |
| 0001 1 | 0 | 0 | 0 | 0 | 1 | 0 |
| 0001 0 | 1 | 1 | 1 | 1 | 0 | 0 |
| 0000 11 | 1 | 1 | 0 | 1 | 0 | 0 |
| 0000 10 | 1 | 0 | 1 | 1 | 0 | 0 |
| 0000 01 | 1 | 0 | 0 | 0 | 1 | 0 |

TABLE B-6···VARIBLE LENGTH CODES
FOR MACTOBLOCK_TYPE IN D-PICTURE

| MACROBLOCK_ TYPE VLC CODE | MACROBLOCK_QUANT | MACROBLOCK_MOTION_FORWARD | MACROBLOCK_MOTION_BACKWARD | MACROBLOCK_PATTERN | MACROBLOCK_INTRA | MACROBLOCK_COMPATIBLE |
|---|---|---|---|---|---|---|
| 1 | 0 | 0 | 0 | 0 | 1 | 0 |

FIG.32

METHOD AND APPARATUS FOR DECODING MPEG-TYPE DATA REPRODUCED FROM A RECORDING MEDIUM DURING A HIGH-SPEED REPRODUCTION OPERATION

TECHNICAL FIELD

This invention relates to a decoding method for moving picture signals and a decoding apparatus therefor, which are adapted to reproducing and decoding coded digital moving picture signals recorded on a recording medium such as optical disc, hard disc or magnetic tape, etc., and more particularly to high speed reproduction.

BACKGROUND ART

Since moving picture data has extremely large quantity of information, it is required for recording/reproducing such moving picture data to use recording media having extremely high continuous transmission rate (speed). Moreover, it is required for transmitting such data to use a communication path having large transmission capacity. At present, in order to record digital video signals of the NTSC television system, VTR using magnetic tape having large tape width, or optical disc recording/reproducing apparatus using optical disc having diameter of about 30 cm is required.

On the contrary, attempts have been made to carry out long time recording of digital video signals onto compact recording media having small recording information quantity. To realize this, there have been proposed systems for efficiently encoding digital video signals to record the encoded signals onto a predetermined recording medium, and efficiently decoding the signals read out therefrom. As one of these systems, there is MPEG (Moving Picture Experts Group) system.

In this MPEG system, differences between picture frames of video signals are first taken to thereby reduce redundancy in the time axis direction. Further, orthogonal transform technique such as Discrete Cosine Transform (DCT), etc. is used to reduce redundancy in the spatial axis direction. In this way, video signals are efficiently encoded to record them onto a predetermined recording medium. Moreover, in the case of reproducing a recording medium on which efficiently coded video signals are recorded by such a method, signals read out from the recording medium are caused to undergo Inverse Discrete Cosine Transform to efficiently decode them, thus to reproduce video signals.

Since devices based on the above-mentioned MPEG system are already on the market as goods (products) and are well known in many publications, the detailed explanation is omitted. Syntax of the MPEG system will now be described. With respect to MPEG, at the time of filing of this application, higher quality standard content called MPEG 2 is being studied, and syntax described below is in the middle of establishment of standardization.

Tables shown in FIGS. 18 to 25 are tables in which syntax is defined. This syntax describes a procedure for permitting analysis of a predetermined bit stream when that bit stream is provided to restore (reconstruct) original signals. FIG. 18 defines video sequence, which is described by programmable language. Such video sequence can be read as flowchart. In addition, this syntax is described in a form such that at least men skilled in the art which study standard of MPEG can easily comprehend its technical contents.

FIG. 19 shows an example of sequence header. The sequence header serves to define the form of moving picture displayed, and, e.g., No. of scanning lines and aspect ratio, etc. are defined. Its example will be described below.

horizontal_size consists of LSB of 12 bits (horizontal_size_value) and MSB of 2 bits (horizontal_size_extension of sequence_extension), and indicates displayable lateral width at luminance component of picture by 14 bits in total.

vertical_size consists of LSB of 12 bits (vertical_size_value) and MSB of 2 bits (vertical_size_extension of sequence-extension), and indicates displayable longitudinal width at luminance component of picture by 14 bits.

frame_rate is flag of 4 bits and the detail of the content of flag is shown in FIG. 26. In the case where non_interlaced_sequence is 0 (interlaced picture), frame_rate indicates No. of frames per one second. In the case where non_interlaced_sequence is 1 (progressive picture), frame_rate indicates No. of progressive pictures per one second.

bit_rate is represented by integer of 30 bits in total of 18 bits of LSB side indicating bit_rate in sequence header and 12 bits of MSB side indicating bit_rate_extension of sequence_extension. Integer of 30 bits indicates bit rate of bit stream with 400 bits/second being as a unit. Fraction is indicated by round-up. Zero is inhibit. Moreover, in the case of variable rate, "3FFFFFFF" is designated.

vbv_buffer_size is flag of 10 bits and indicates LSB side 10 bits of vbv_buffer_size. VBV buffer size is represented by integer of 18 bits. 10 bits of LSB (Least Significant Bit) side is vbv_buffer_size, and 8 bits of MSB side is represented by vbv_buffer_size_extension in sequence_extension. This integer of 18 bits indicates VBV buffer size necessary for decoding sequence. VBV is virtually buffer control system for allowing buffer that decoder has not to overflow or underflow, and the detail thereof is described in MPEG 2 Working Draft or Annex C of Test Model.

This is defined by the following expression.

$$B=16*1024*vbv\_buffer\_size$$

B indicates VBV buffer size necessary as minimum as possible for decoding sequence in terms of bit units.

FIG. 20 shows an example of table of quantization matrix.

load_intra_quantizer_matrix is flag of 1 bit. In the case where intra_quantizer_matrix is down-loaded, this bit is set to "1". In the case where that bit is set to "0", default values shown in FIG. 27 are used. intra_quantizer_matrix is data of 8 bits×64. In the case where this is down-loaded, values are transmitted in order of zigzag scan, and current value is overwritten onto the previous (former) value. Down-loaded value is valid (effective) until it is down-loaded next.

load_non_intra_quantizer_matrix is flag of 1 bit. In the case where non_intra_quantizer_matrix is down-loaded, this bit is set to "1". In the case where this bit is set to "0", default values shown in FIG. 28 are used. non_intra_quantizer_matrix is data of 8 bits×64. In the case where such data is down-loaded, respective values are transmitted in order of zigzag scan, and current value is overwritten onto the previous (former) value. Down-loaded value is valid (effective) until it is down-loaded next.

chroma_format is flag of 2 bits, and can indicate three kinds of formats of color difference signals as shown by the following table.

| flag | Meaning |
| --- | --- |
| 00 | reserved |
| 01 | 4:2:0 |
| 10 | 4:2:2 |
| 11 | 4:4:4 | sequence_start_code_identifier is flag of 4 bits and is identifier indicating type of extension_data. This is shown in FIG. 29.

FIG. 21, 22 show picture header. temporal_reference is flag of 10 bits and indicates display order of picture. This is expressed by remainder when value incrementing by one every time picture is inputted at counter of picture is divided by 1024. In respective GOPs, temporal_reference is reset to 0 by the first picture in terms of display order of picture. Moreover, in the case where frame is divided into two fields by Field coding, temporal_reference with respect two fields are the same value.

picture_coding_type is flag of 3 bits and is identifier of picture coding type, and there are Intra-frame coded picture (I picture), Predictive (coded) picture (P picture), Bidirectionally predictive (coded) picture (B picture) and only DC component of intra-frame coded picture (D picture). They are shown in FIG. 30. It is prohibited that D picture appears within video sequence in a manner to coexist with pictures of other types.

vbv_delay is flag of 16 bits. In the case of fixed rate coding, vbv_delay is used for setting initial value of buffer occupation ratio in the case of start of decode of decoder. By this flag, it is possible to avoid overflow or underflow of decoder buffer. vbv_delay is designated by delay time required until VBV buffer is caused to be from empty state to the state having correct buffer occupation ratio at target bit rate R. Thereafter, the first picture data is taken out from VBV buffer.

vbv_delay is delay quantity measured with system clock of 90 Hz being as unit from the time point when VBV receives the last 1 byte of picture_start_code of the first picture_start_code. This is represented by the following expression.

$$vbv\_delay = 90000 * B\_n/R \quad n>0$$

B_n: VBV buffer occupation ratio in the state where picture n is present within buffer except for GOP header and sequence header attached to the front picture n. Accordingly, in the case of fixed rate coding, vbv_delay indicates buffer occupation quantity in reading out that picture.

R: bit rate indicated by bit_rate within sequence header intra_dc_precision is flag of 2 bits and prescribes precision (accuracy) of DC component of intra macro block. By this identifier, step size in quantization/inverse quantization of intra DC coefficients is changed.

Provision of intra_dc_precision is indicated by the following table.

| flag | Meaning |
| --- | --- |
| 00 | dc_precision: 8 bits |
| 01 | dc_precision: 9 bits |
| 10 | dc_precision: 10 bits |
| 11 | dc_precision: 11 bits | picture_structure is flag of 2 bits and is identifier for carrying out switching between Frame structure and Field structure.

Its content is shown by the following table.

| flag | Meaning |
| --- | --- |
| 00 | Frame Picture |
| 01 | Top Field |
| 10 | Bottom Field |
| 11 | reserved | qscale_type is flag of 1 bit and identifier indicating whether linear quantization characteristic is used as quantization characteristic or non-linear quantization characteristic is used as quantization characteristic.

Its content is shown by the following table.

| flag | Meaning |
| --- | --- |
| 0 | MPEG1 compatible: linear |
| 1 | non linear law | intra_vlc_format is flag of 1 bit and is identifier for switching, which indicates whether or not VLC table for intra macro block is used.

Its content is shown by the following table.

| flag | Meaning |
| --- | --- |
| 0 | MPEG1 VLC |
| 1 | Alternative Intra VLC | alternate_scan is flag of 1 bit. In the case where this flag is set to "0", ordinary zigzag scan is used. In the case where this flag is set to "1", zigzag scan of different path is used.

Slice header is shown in FIG. 23. slice_start_code is start code of 32 bits, wherein the first 24 bits are "000001" in hexadecimal notation and slice_vertical_position of 8 bits is subsequent thereto. This slice_vertical_position takes values in the range from "01" to "AF".

slice_vertical_position indicates vertical position of the leading macro block within slice. slice_vertical_position of the first column of macro block is 1. slice_vertical_position must be set so that slices do not overlap and do not have gap therebetween. Maximum value of slice_vertical_position is 175.

FIG. 24 is macro block header. macroblock_address_increment indicates difference between address of the previous (former) macro block and address of current macro block by VLC. Maximum value of macroblock_address_increment is 33. Values more than 33 are represented by combination of macroblock_address_increment and macroblock_escape. Macro block address (macroblock-address) is variable (parameter) for defining absolute address of current macro block.

macroblock_address becomes equal to 0 at macro block of the left upper of picture frame. The previous macro block address (previous_macroblock_address) is variable (parameter) for defining absolute address of macro block immediately before which is not skipped except for the leading macro block of slice. previous_macroblock_address at the leading portion of slice is reset by the following expression.

previous_macroblock_address=(slice_vertical_position −1)*mb_width−1. Spatial position having macro block as unit (mb_row, mb_column) is calculated from macroblock_address by the following expression.

mb_row=macroblock_address/mb_width mb_column=macroblock_address % mb_width

Here, mb_width is No. of columns of macro block within picture. macroblock_type is VLC code indicating type of coding method of macro block. Macro block types are shown in FIGS. 31 and 32.

Meanwhile, in the case of carrying out high speed reproduction of recording medium on which video signals efficiently encoded by the above-described MPEG system are recorded, in coding by the MPEG system, the fact that coding is carried out by making use of motion prediction between frames becomes problem. Namely, since decoding is impossible if there is no decoded picture of past or future frame with respect to current frame, it is impossible to select an arbitrary frame to reproduce it at high speed.

In practice, frame which can be decoded by direct access is only intra-frame coded frame (hereinafter referred to as intra-frame). Moreover, even if only intra-frames ordinarily existing at a rate of one to several tens of frames are reproduced, high speed reproduction of rough movement can be only conducted. In the case of carrying out high speed reproduction, a portion of coded video signals recorded on recording medium would be reproduced. Namely, all or a portion of intra-frames would be reproduced. As a result, insufficient coded picture signal in which information necessary for decoding is partially missing is transmitted to picture signal decoding apparatus. It is to be noted that there are instances where processing is carried out by field with respect to frame. Explanation will be given on the premise that intra-frame and intra-field are collectively referred to as intra-picture (referred to as I picture).

Let now consider the case where, e.g., only I pictures are displayed at the time of high speed reproduction. There occurs the problem that even in the case where data of I picture including header information can be all read out, temporal_reference becomes discontinuous. In the MPEG system, at present, in the case where temporal_reference is discontinuous, corresponding picture is dealt as skip picture. Namely, frame immediately before that frame is repeatedly displayed. For this reason, high speed reproduction becomes impossible.

Moreover, in the case where only a portion of one frame can be read out at the time of high speed reproduction, even if header information such as picture header, etc. can be read, since it is not allowed that any gap exists in slice, picture signal decoding apparatus would becomes unable to decode such a coded signal. Further, in the case where header information partially becomes missing, picture signal decoding apparatus would fail to decode coded picture signal. In addition, in either case, at the time of high speed reproduction, vbv fails to correctly operate. This is because vbv is set on the assumption of normal reproduction. To solve these problems is the task of high speed reproduction in the MPEG system.

DISCLOSURE OF THE INVENTION

A decoding method of this invention is directed to a decoding method for a coded signal encoded by a predetermined system, the method comprising the steps of receiving a coded signal consisting of a portion which is in conformity with the predetermined system and a portion which is not in conformity with the predetermined system, transforming the portion which is in conformity with the predetermined system into another signal, or supplementing insufficient information to the portion which is not in conformity with the predetermined system, transforming the coded signal into a coded signal which is in conformity with the predetermined system, and decoding the transformed coded signal in accordance with the predetermined system. Moreover the decoding method of this invention reproduces, by special reproduction from a recording medium on which coded signals encoded by a predetermined system are recorded, a coded signal consisting of the portion which is in conformity with the predetermined system and the portion which is not in conformity with the predetermined system Here, the predetermined system is MPEG system or MPEG 2 system. At this time, the portion in conformity with the predetermined system at least includes intra-coded picture signal, and the portion which is not in conformity with the predetermined system is header information. Moreover, decoding method of this invention transforms temporal_reference in the received decoded signal, or transforms vbv_delay in the received coded signal into a value corresponding to bit quantity of the received coded signal. Further, decoding method of this invention carries out inserting of sequence_start_code and sequence_end_code every predetermined coding unit in the received coded signal, processing for transforming vbv_delay in the received coded signal into a value indicating variable rate, or inserting of stuffing data into the received coded signal. Moreover, the received coded signal is a coded signal of a unit smaller than picture unit in the predetermined system, and decoding method of this invention judges whether or not the received signal is in conformity with the predetermined system to carry out inserting of sequence_error_code into the portion which is not in conformity with the predetermined system of the received coded signal, or processing, as skip macro block, of the portion which is not in conformity with the predetermined system of the received coded signal.

Decoding method of this invention is directed to a decoding method for a coded signal encoded by a predetermined system, the decoding method comprising the steps of receiving coded signal consisting of a portion which is in conformity with the predetermined system and a portion which is not in conformity with the predetermined system, and decoding the received coded signal in accordance with only a portion of the predetermined system. Moreover, decoding method of this invention reproduces, by special reproduction from recording medium on which coded signals encoded by a predetermined system are recorded, a coded signal consisting of a portion which is in conformity with the predetermined system and a portion which is not in conformity with the predetermined system.

Here, the predetermined system is MPEG system or MPEG 2 system. At this time, decoding method of this invention carries out the above-mentioned decoding by disregarding VBV and temporal_reference, and outputs already decoded picture as display picture until the next picture is decoded. Moreover, in decoding method of this invention, the received coded signal at least includes intra-frame coded signal of slice unit, and carries out the above-mentioned decoding in accordance with slice_vertical_position in the received coded signal to fill up slice gap by using picture outputted last as display picture. Further, decoding method of this invention carries out switching between decoding in accordance with the predetermined system and decoding in accordance with only a portion of the predetermined system on the basis of flag indicating special reproduction inserted into sequence header, or adds data of picture header and/or sequence header necessary for decoding picture coded signal of slice unit to slice header to carry out the above-mentioned decoding on the basis of the added data.

Decoding apparatus of this invention is directed to a decoding apparatus for a coded signal encoded by a predetermined system, comprising: transforming means adapted for receiving a coded signal consisting of a portion which is in conformity with the predetermined system and a portion which is not in conformity with the predetermined system to transform the portion which is in conformity with the predetermined system into another signal, or supplementing insufficient information to the portion which is not in conformity with the predetermined system to transform the coded signal into coded signal which is in conformity with the predetermined system, and decoding means for decoding the transformed coded signal in accordance with the predetermined system. Moreover, decoding apparatus of this invention includes reproducing means for reproducing, by special reproduction from recording medium on which coded signals encoded by a predetermined system are recorded, coded signal consisting of a portion which is in conformity with the predetermined system and a portion which is not in conformity with the predetermined system.

Here, the predetermined system is MPEG system or MPEG 2. At this time, the portion which is in conformity with the predetermined system at least includes intra-coded picture signal, and the portion which is not in conformity with the predetermined system is header information. Moreover, decoding apparatus of this invention includes transforming means for transforming temporal_reference in the received coded signal. Further, decoding apparatus of this invention includes transforming means for transforming vbv_delay in the received coded signal into a value corresponding to bit quantity of the received coded signal, inserting means for inserting sequence_start_code and sequence_end_code every predetermined coding unit in the received coded signal, and transforming means for transforming vbv_delay in the received coded signal into a value indicating variable rate, etc., and further includes inserting means for inserting stuffing data into the received coded signal. In addition, in decoding apparatus of this invention, the received coded signal is a coded signal of unit smaller than picture unit in the predetermined system, and the decoding apparatus comprises judging means for judging whether or not the received signal is in conformity with the predetermined system, and inserting means for inserting sequence_error_code into the portion which is not in conformity with the predetermined system of the received coded signal, or judging means for judging whether or not the received signal is in conformity with the predetermined system, and the decoding means process, as skip macro block, the portion which is not in conformity with the predetermined system of the received coded signal.

Decoding apparatus of this invention is directed to a decoding apparatus for coded signal encoded by a predetermined system, and includes decoding means adapted for receiving coded signal consisting of portion which is in conformity with the predetermined system and portion which is not in conformity with the predetermined system to decode the received coded signal in accordance with only a portion of the predetermined system. Moreover, decoding apparatus of this invention includes reproducing means for reproducing, by special reproduction from recording medium on which coded signals encoded by a predetermined system are recorded, coded signal consisting of portion which is in conformity with the predetermined system and portion which is not in conformity with the predetermined system.

Here, the predetermined system is MPEG system or MPEG 2 system. At this time, the decoding means carries out the above-mentioned decoding by disregarding VBV and temporal_reference, and outputting of already decoded picture as display picture until the next picture is decoded. Moreover, in the decoding apparatus of this invention, the received coded signal at least includes picture coded signal of slice unit, and the decoding means carries out the above-mentioned decoding in accordance with slice_vertical_position in the received coded signal, and the decoding means fills up slice gap by using picture outputted last as display picture. Further, the decoding means of decoding apparatus of this invention carries out switching between decoding in accordance with the predetermined system and decoding in accordance with a portion of the predetermined system on the basis of flag indicating special reproduction inserted into sequence header. In addition, decoding apparatus of this invention includes adding means for adding, to slice header, data of picture header and/or sequence header necessary for decoding picture coded signal of slice unit, and the decoding means carries out the above-mentioned decoding on the basis of the added data.

From facts as described above, in accordance with this invention, even at the time of high speed reproduction, signal in conformity with MPEG standard is inputted to decoding apparatus, or signal indicating that reproduction mode shifts to special reproduction is inputted to decoding apparatus to transmit flag necessary for special reproduction, thereby making it possible to realize special reproduction such as high speed reproduction, etc. In addition, from facts as described above, only TV or HDTV monitor is caused to have decoding unit (apparatus), and various picture signal recording apparatuses, e.g., VTR, video disc player are not required to have decoding unit (apparatus). Thus, circuit configuration can be advantageously simplified.

BRIEF DESCRIPTION OF THE DRAWINGS

FIG. 13 shows an example of sequence header to which ff_sequence of 1 bit is applied.

FIG. 15 is a flowchart showing an example of slice header at the time of high speed reproduction.

FIG. 18 is a table defining video sequence.

FIG. 19 is a table of sequence header.

FIG. 20 is a table of quantization matrix.

FIG. 21 is a table of picture header.

FIG. 22 is a table of picture header.

FIG. 23 is a table of slice header.

FIG. 24 is a table of macro block header.

FIG. 25 is a table of motion vector.

FIG. 26 is a table of frame rate.

FIG. 27 is a default value table of quantization matrix.

FIG. 28 is a default value table of quantization matrix.

FIG. 29 is an identifier table showing extension_data.

FIG. 30 is an identifier table showing picture_coding_type.

FIG. 31 is a table of VLC code showing macroblock_type.

FIG. 32 is a table of VLC code showing macroblock_type.

BEST MODE FOR CARRYING OUT THE INVENTION

Figure 1:
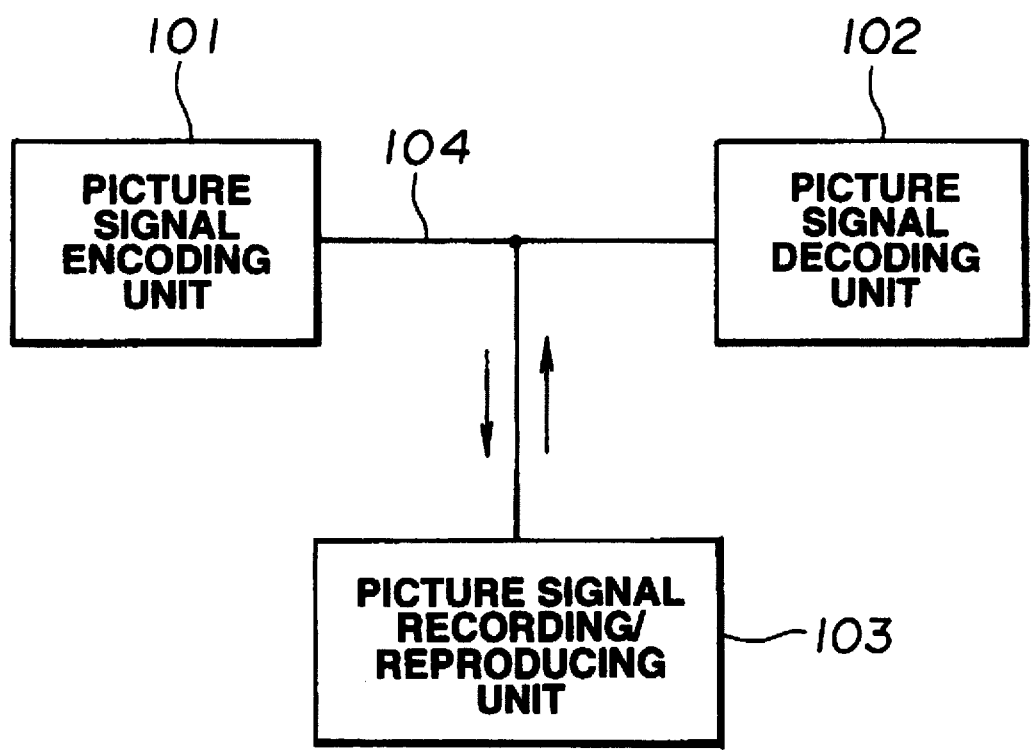
FIG. 1 is an example of the configuration of picture signal encoding/decoding apparatuses (units) and picture signal recording apparatus (unit) to which this invention is applied.

Preferred embodiments of this invention will now be described in detail with reference to the attached drawings. Block diagram of a picture signal encoding apparatus (unit), a picture signal decoding apparatus (unit), and a picture signal recording/reproducing apparatus (unit) in the embodiment of this invention is shown in FIG. 1. Picture signal encoding unit 101, picture signal decoding unit 102, and picture signal recording/reproducing unit 103 are connected by way of digital signal transmission path 104. Moreover, original picture signal is standard TV signal (NTSC, PAL, SECAM) or HDTV signal.

Picture signal recording/reproducing apparatus (unit) 103 will now be described. The picture signal recording/ reproducing apparatus 103 is digital VTR for recording/ reproducing picture signals onto or from magnetic tape, or digital video disc for recording/reproducing picture signals onto or from optical disc, or refers to computer system for carrying out recording onto hard disc or CD-ROM.

Figure 5:
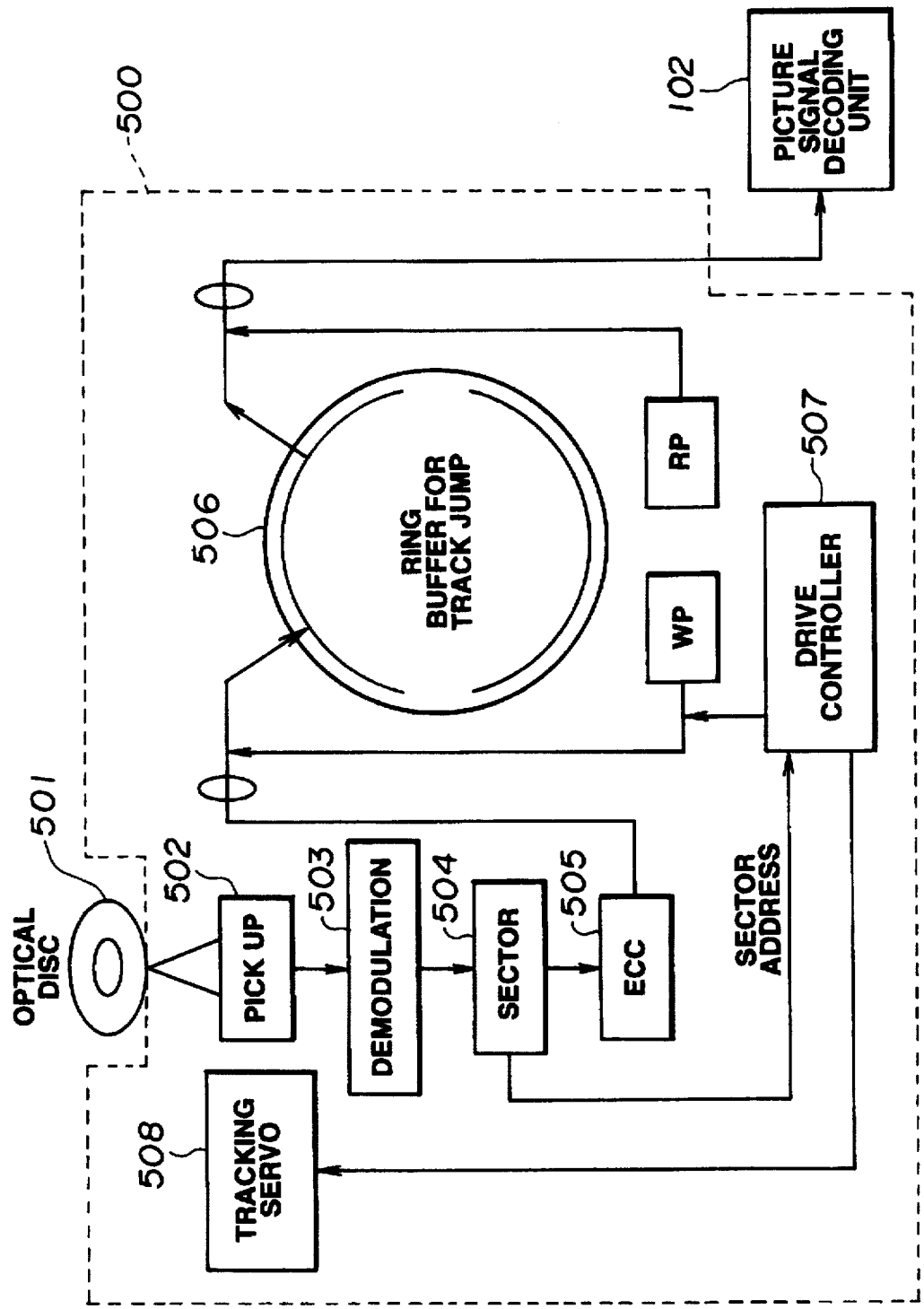
FIG. 5 is a view showing the configuration of encoding apparatus of this invention.

FIG. 5 is an example of video disc unit 500 as an example of picture signal recording/reproducing apparatus 103. In order to reproduce signals recorded on disc-shaped medium 501, a signal is first read by pick-up 502 to demodulate output data by means of demodulating circuit 503. When data of one sector is stored in sector buffer 504, error correction is carried out by error corrector 505. The error-corrected signal is inputted to ring buffer 506.

Drive controller 507 reads sector address of data which has been read thereinto to sent control signal to tracking servo circuit 508 in the case where track jump is required to move pick-up 502 up to a designated track to read a predetermined sector. Bit stream of ring buffer 506 is caused to be moving picture data by picture signal decoding apparatus (unit) 102.

Figure 16:
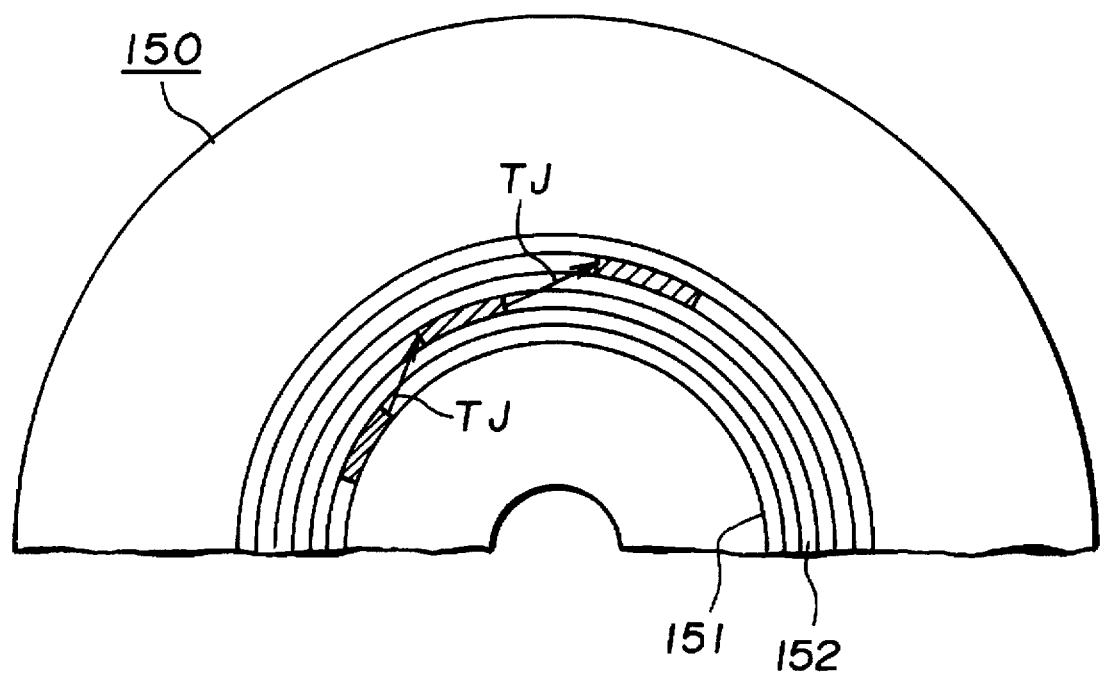
FIG. 16 is a view for explaining tracking state of video disc player.

Meanwhile, high speed reproduction in video disc unit is carried out as shown in FIG. 16 by reading out a plurality of sectors on a certain track 151 of disc 150 thereafter to carry out track jump (TJ) to read out a predetermined sector on the next predetermined track 152. At times subsequent thereto, such an operation is repeated to thereby carry out high speed reproduction of moving picture. It should be noted that high speed reproduction includes not only reproduction in time progressive direction but also reproduction in reverse direction, i.e., reverse high speed reproduction.

Figure 17:
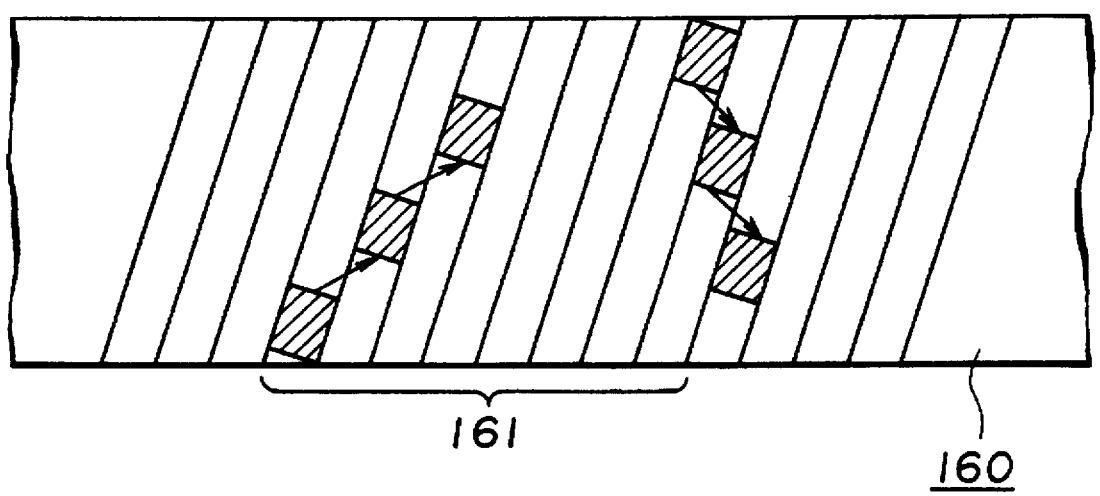
FIG. 17 is a view for explaining tracking state of VTR.

Similarly, high speed reproduction in VTR is carried out as shown in FIG. 17. Namely, magnetic tape 160 is caused to undergo high speed feeding to thereby allow rotary head to traverse (cross) a plurality of tracks on the tape to read out a plurality of sectors on that locus. At times subsequent thereto, such an operation is repeated to thereby carry out high speed reproduction of moving picture. It should be noted that, at the time of reverse high speed reproduction, tape is caused to undergo high speed reverse (return) operation.

The simplest high speed reproduction in the case of disc-shaped medium is a method of reproducing only data of I picture. With respect to I picture, decoding of picture (frame) can be made by itself. In this case, pick-up is moved to track including data of I picture to read out data to detect picture start code of I picture to decode data of I picture to output it. In the case of the disc-shaped medium, even if recording is not made in the state where data for high speed reproduction is added, it is possible to read out picture header at the time of high speed reproduction. An example of a picture signal recording/reproducing apparatus for recording picture signals onto magnetic tape will now be described.

Figure 6:
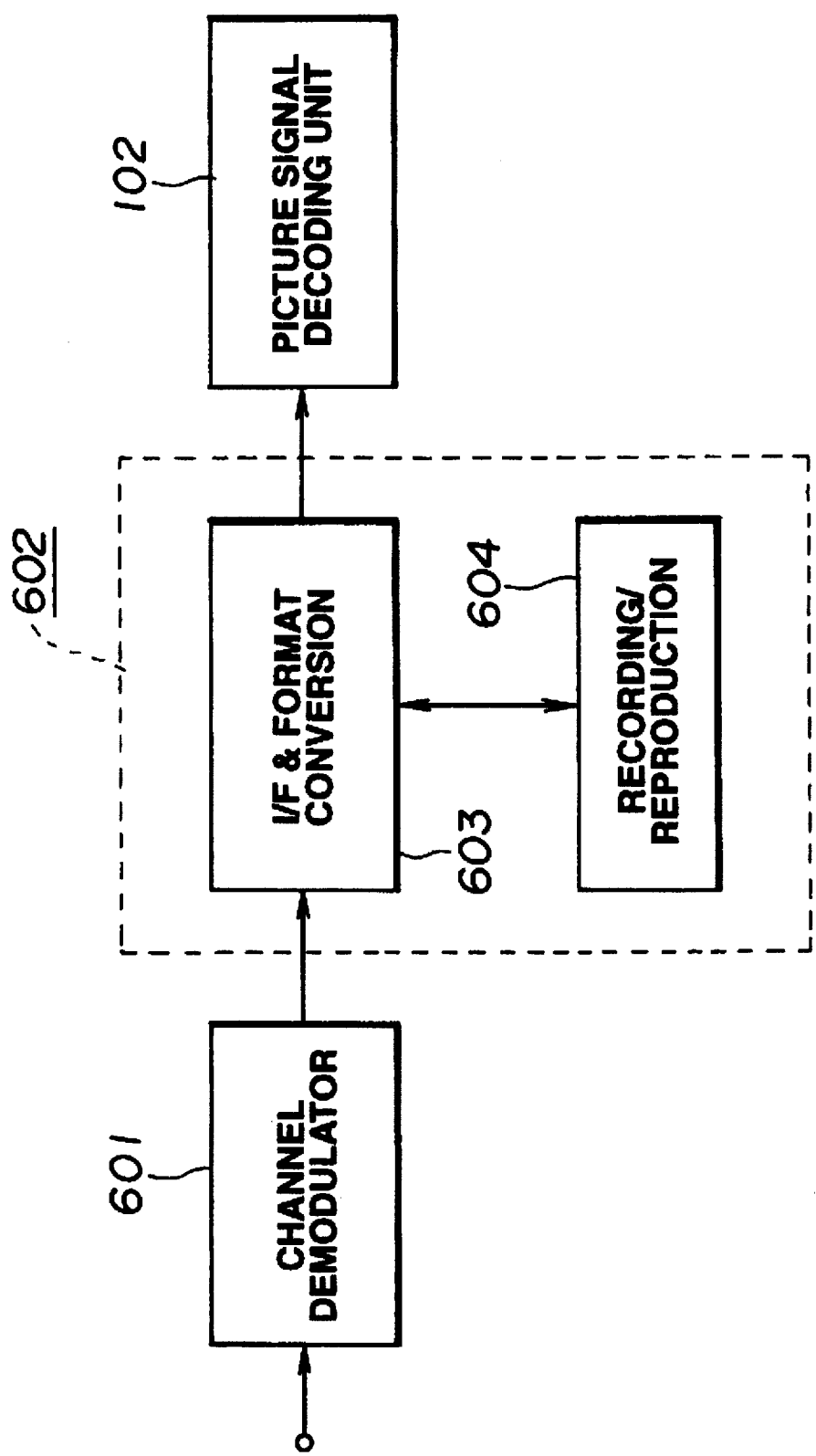
FIG. 6 is a view showing the configuration of digital video disc player.

FIG. 6 is an example of digital VTR system. In FIG. 6, reference numeral 601 denotes channel demodulator. Coded picture signal is inputted from input terminal to channel demodulator 601. At channel demodulator 601, transmit data is demodulated. Signal outputted from channel demodulator 601 is inputted to digital VTR 602. This digital VTR 602 includes interface and format converting section 603 and recording/reproducing section 604. Signal from the channel demodulator 601 is delivered to transporter through interface and format converting section 603, and is also delivered to recording/reproducing section 604.

Data transferred to recording/reproducing section 604 through interface and format converting section 603 is recorded onto magnetic tape at recording/reproducing section 604. Moreover, interface and format converting section 603 formats data sent to recording/reproducing section 604 so that reproduction picture becomes satisfactory when recording data recorded at recording/reproducing section 604 is caused to undergo high speed reproduction.

Figure 7:
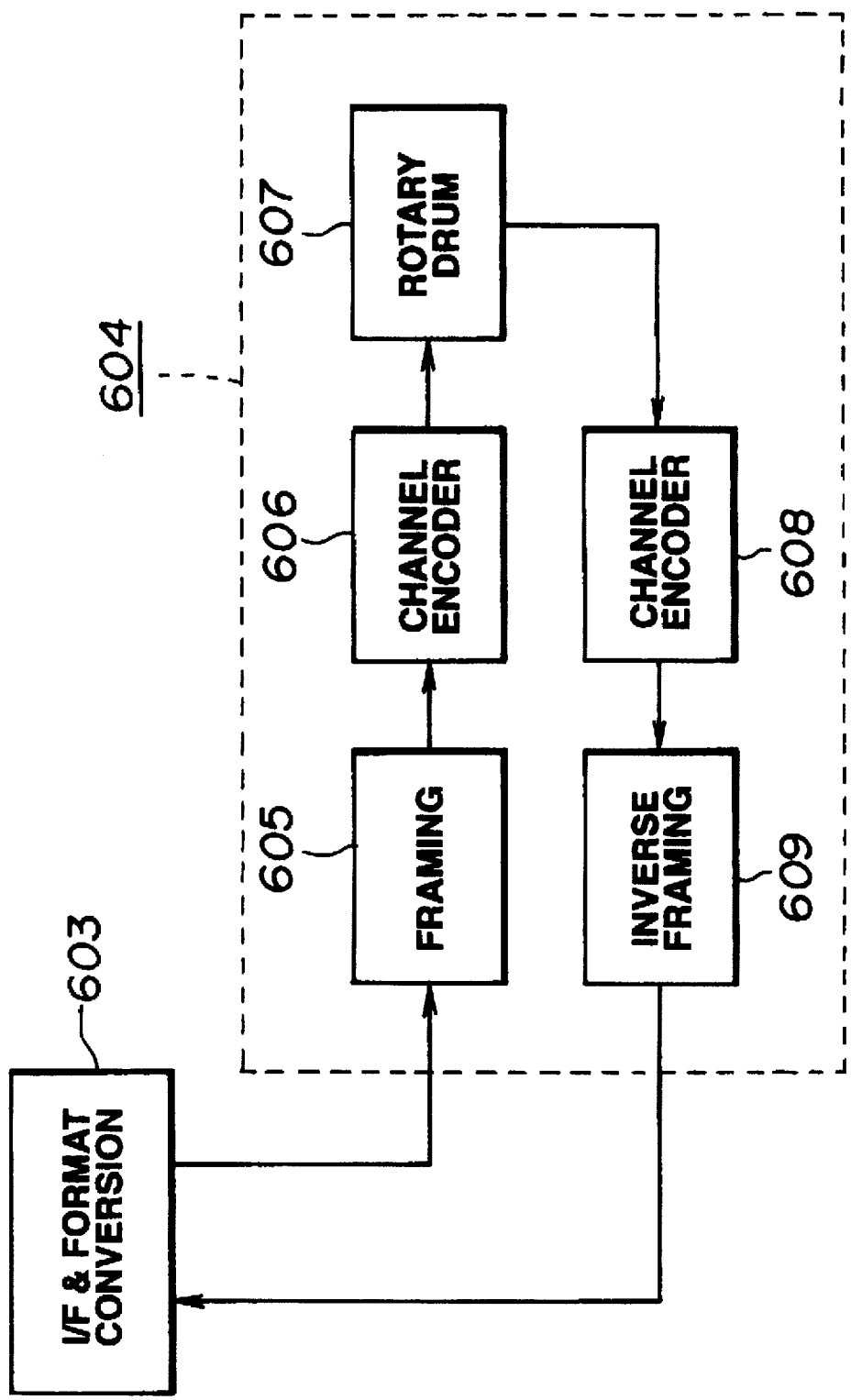
FIG. 7 is a block diagram for explaining, in detail, recording reproducing section 604.

FIG. 7 is a block diagram for explaining in detail the recording/reproducing section 604. Recording section of recording/reproducing section 604 comprises framing circuit 605, channel encoder 606, and rotary head 607. Video signal caused to have predetermined format by interface and format converting section 603 is caused to be of frame structure by framing circuit 605, and is distributed to a plurality of channels by channel encoder 606. Signals of respective channels are recorded onto magnetic tape (not shown) by means of rotary head 607. Reproducing section of recording/reproducing section 604 is composed of inverse framing circuit 609 and channel decoder 608, which respectively carry out operations reverse (opposite) to those of framing circuit 605 and channel encoder 606. At the time of high speed reproduction, since head 607 reproduces recorded data while obliquely traversing (crossing) a plurality of tracks, data of all sectors are unable to be reproduced, so only data of several sectors are reproduced. In the case of carrying out high speed reproduction of data recorded on magnetic tape, data of one frame becomes imperfect from facts described above. Namely, even in such cases of decoding I picture, it is impossible to decode all of I pictures. Moreover, picture header is not necessarily reproduced. As stated above, also in both cases of disc-shaped medium and magnetic tape, all data are not reproduced at the time of high speed reproduction, and discontinuous data would be consequently reproduced. Moreover, also in both cases of disc-shaped medium and tape medium, there may be employed a method of adding data for high speed reproduction to record such data to read out that data in high speed reproduction. In this case, also at the time of high speed reproduction, it becomes possible to read out picture header, etc. In addition, it also becomes possible to reproduce data of all macro blocks of a single I picture.

Figure 2:
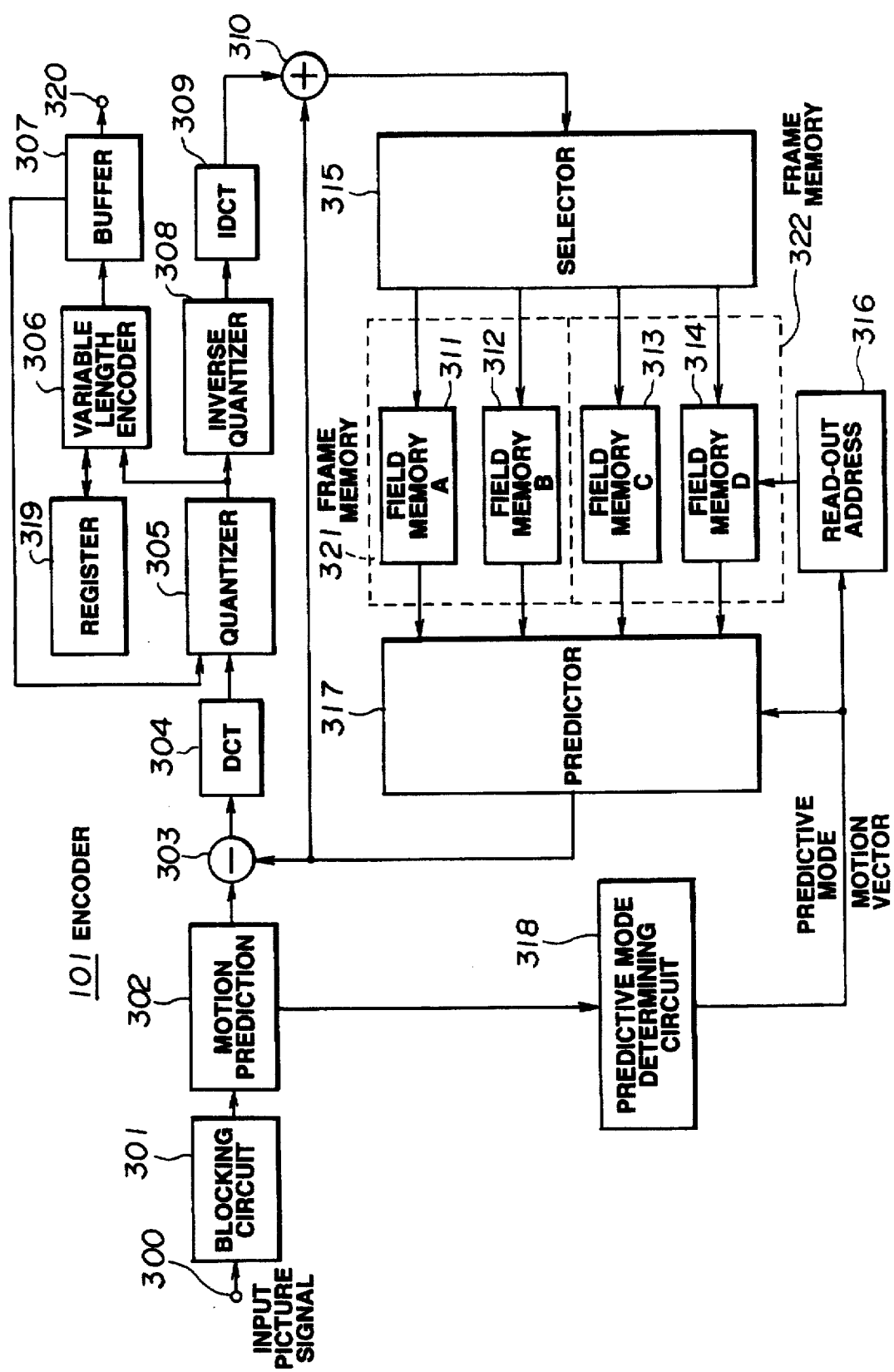
FIG. 2 is an example of the configuration of picture signal encoding apparatus.

Picture signal encoding apparatus 101 is constituted as shown in FIG. 2, for example. Input picture signal 300 is inputted to blocking circuit 301, at which it is converted from the standard format, e.g., NTSC system, etc. to block format of macro block units of, e.g., 16×16 pixels. The data converted into block format is inputted to motion predicting circuit 302, and is further sent to difference detector 303 therefrom. This difference detector 303 is supplied through predictor 317 with motion-compensated picture data from field memory groups 311~314 constituting frame memories 321, 322. The difference detector 303 detects difference between both inputs to output it.

Output of difference detector 303 is sent to DCT circuit 304 for carrying out DCT processing which is a sort of orthogonal transform. DCT coefficient data obtained after undergone DCT processing at DCT circuit 304 is sent to quantizer 305, at which such data is quantized. Quantized data from quantizer 305 is changed into variable length code by variable length encoder 306 for carrying out variable length encoding processing such as so called Huffman coding or run length coding, etc. The variable length encoder 306 also encodes predictive mode, motion vector, various headers such as temporal_reference, frame_rate, vbv_delay, etc. Into register 319, code conversion system for converting fixed length code data into variable length code data is stored as table. Further, variable length coded data is outputted to digital transmission path 320 as coded data through buffer 307.

In this example, signal corresponding to data storage quantity in buffer 307 is fed from buffer 307 back to quantizer 305 in order to prevent overflow or underflow thereof. Quantizer 305 is operative in correspondence with this signal so that in the case where data storage quantity attempts to overflow, it allows quantization step to be coarse to thereby decrease information quantity. On the other hand, in the case where data storage quantity attempts to underflow, the quantizer 305 allows quantization step to be fine to thereby increase information quantity.

Quantized data outputted from quantizer 305 is inputted to inverse quantizer 308, at which inverse quantization processing complementary to quantization processing at quantizer 305 is carried out. Output of the inverse quantizer 308 is caused to undergo, by IDCT circuit 309, IDCT processing complementary to DCT processing at DCT circuit 304. Output of this IDCT circuit 309 is delivered to adder 310. At adder 310, output of IDCT circuit 309 is added to data obtained by motion-compensating outputs of field memory groups 311~314 by predictor 317. Output of this adder 310 is delivered to any one of field memory group 311~314 through selector 315, and is stored thereinto.

On the other hand, motion predicting circuit 302 detects, in macro block units, motion vector between pictures (frames) and sum of differences between absolute values of respective pixels to output these data (data of motion vector between pictures and data of sum of differences between absolute values) to motion predictive mode determining circuit 318. The motion predictive mode determining circuit 318 determines any one of motion predictive modes described below, foe example.

(1) Forward predictive mode from previous frame preceding in point of time.

(2) Bidirectionally predictive mode from two frames of previous frame preceding in point of time and later frame succeeding in point of time (implementation of linear operation (e.g., mean value calculation) every pixel of reference macro block from previous frame and reference macro block from later frame)

(3) Backward predictive mode from later frame (4) Intra-coding (intra-frame coding mode)

Namely, with respect to I picture, intra-frame coding where I picture itself completes within frame is carried out. P picture is formed by prediction from frame (I picture or P picture) which is later in point of time (future). Moreover, B picture is formed by prediction from frame (I picture or P picture) which is previous in point of time (past) and frame which is later in point of time (future).

Memory controller 316 is supplied with predictive mode data and motion vector from predictive mode determining circuit 318. Moreover, predictor 317 is supplied with predictive mode data. Memory controller 316 changes read-out addresses of field memory group 311~314 in correspondence with these data. Predictor 317 outputs data which has been read out as it is or carries out addition thereof in correspondence with predictive mode data. Thus, motion-compensated data is outputted from predictor 317.

Figure 3:
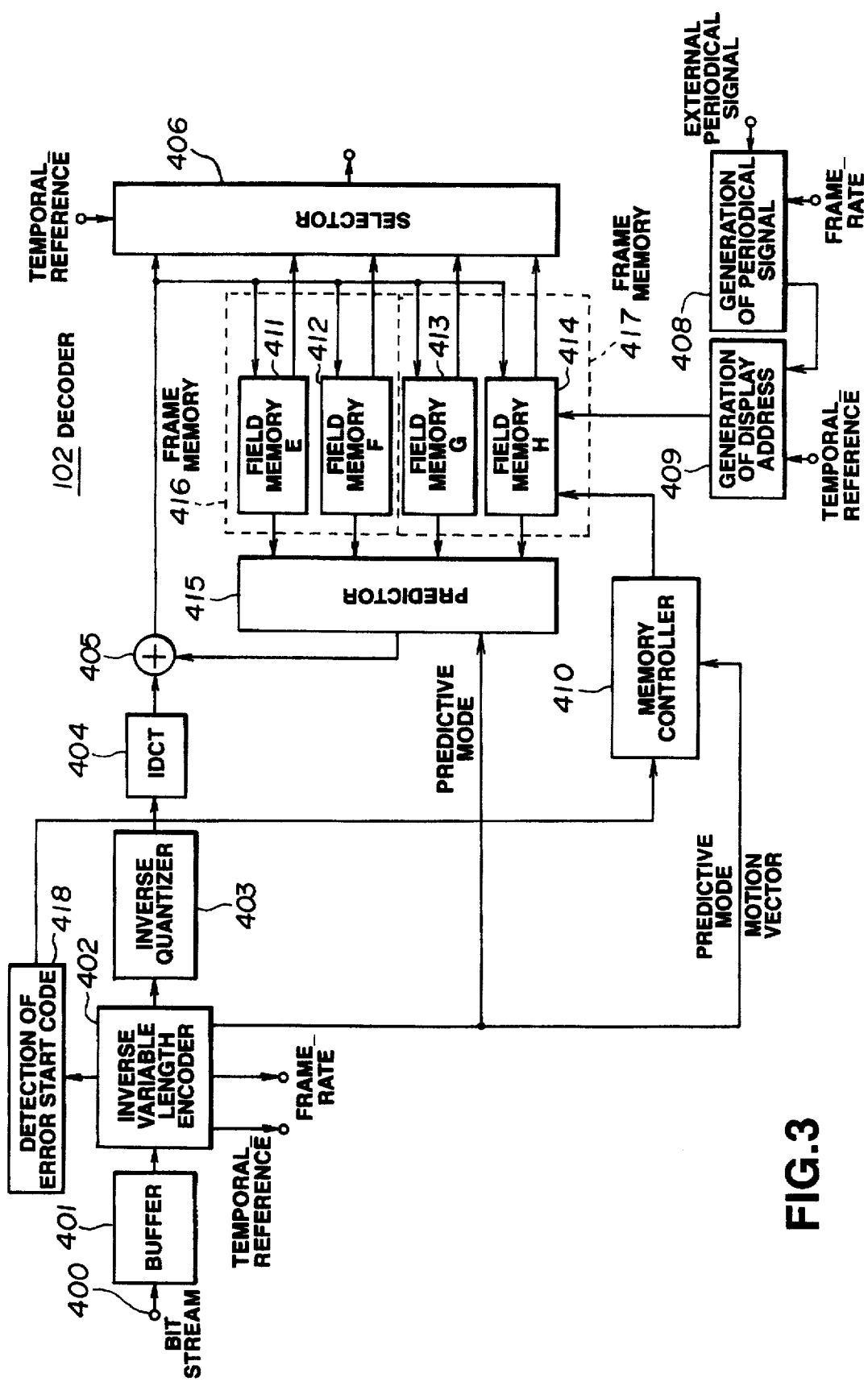
FIG. 3 is an example of the configuration of picture signal decoding apparatus.

Picture signal decoding apparatus 102 in the first and second embodiments will now be described. Picture signal decoding apparatus 102 is constituted as shown in FIG. 3, for example. Coded bit stream 400 is temporarily stored into buffer 401. This data is read out from buffer 401, and is caused to undergo inverse variable length coding (variable length decoding) by inverse variable length encoder (coder) (IVLC) 402. Inverse variable length encoder 402 reads out data in accordance with timing indicated by vbv_delay. Moreover, inverse variable length encoder 402 carries out separation of predictive mode, motion vector and various headers such as temporal_reference, frame_rate, etc. Decoded data is inputted to inverse quantizer 403, at which it is inverse-quantized every block in accordance with information (quantization step) taken out from bit stream. The inverse-quantized data thus obtained is further caused to undergo inverse DCT (IDCT) at IDCT circuit 404. Inverse quantizer 403 and IDCT circuit 404 respectively operate complementarily to quantizer 305 and DCT circuit 304 of FIG. 2.

Memory controller 410 changes read-out addresses of field memories 411~414 constituting frame memories 416, 417 in correspondence with predictive mode and motion vector separated from inputted data. Predictor 415 outputs data which has been read out in correspondence with predictive mode data as it is, or carries out addition thereof. Thus, data which has been motion-compensated by predictor 415 is inputted to adder 405. This adder 405 adds output of predictor 415 to output of IDCT circuit 404 to decode original picture. This decode picture is stored into field memories 411~414 as the next predictive picture. Display address generator 409 controls read-out addresses of field memories 411~414 so that pictures (frames) are read out in display order indicated by temporal_reference. Selector 406 selects picture to be outputted from output picture of adder 405 or output pictures of field memories 411~414 in accordance with temporal_reference.

In a manner stated above, with respect to picture signals stored in field memories 411~414, picture corresponding to address that display address generator 409 generates is read out and is delivered to scan converter (not shown) through selector 406. Scan converter is a device adapted for converting the number of lines of inputted data to output it to display such as CRT, etc. In this way, bit stream is displayed on display as moving picture.

In this example, periodical signal generator 408 generates frame pulses of interval corresponding to frame_rate in synchronism with, e.g., external periodical signal outputted from display to output them to display address generator 409. This display address generator 409 generates display addresses in synchronism with these frame pulses.

A first embodiment to which this invention is applied will now be described in detail. The first embodiment is directed to the case where all of I pictures and respective headers can be read out from picture signal recording/reproducing apparatus even at the time of high speed reproduction. In the first embodiment, picture signal recording/reproducing unit 103 outputs picture signal in conformity with MPEG system to picture signal decoding unit 102 in both cases of normal reproduction and high speed reproduction. In this case, picture signal decoding unit 102 carries out decode operation similarly to normal reproduction also at the time of high speed reproduction. Namely, all header information such as sequence header, GOP header and picture header, etc. are transmitted at the time of high speed reproduction as well.

Method of high speed reproduction in this case will now be described. The simplest high speed reproducing method is a method of transmitting intra-frame coded data, i.e., intra-data at the time of high speed reproduction to decode them. Namely, this method is a method of decoding only I pictures to output them. Let now consider, e.g., the case where I pictures exist, e.g., at a rate of one frame to 15 frames. In this case, when reproduction is assumed to be carried out, e.g., at quintuple speed, I picture is decoded to output the same picture by three frames to similarly decode the next I picture to output it. In this case, such signals would be a signal which is not in conformity with the MPEG system from two facts as described below.

One problem is that temporal_reference recorded in picture header is different from recorded value in the case of high speed reproduction. The other problem is that because normal reproduction is assumed, set vbv_delay does not indicate correct value at the time of high speed reproduction.

Figure 8:
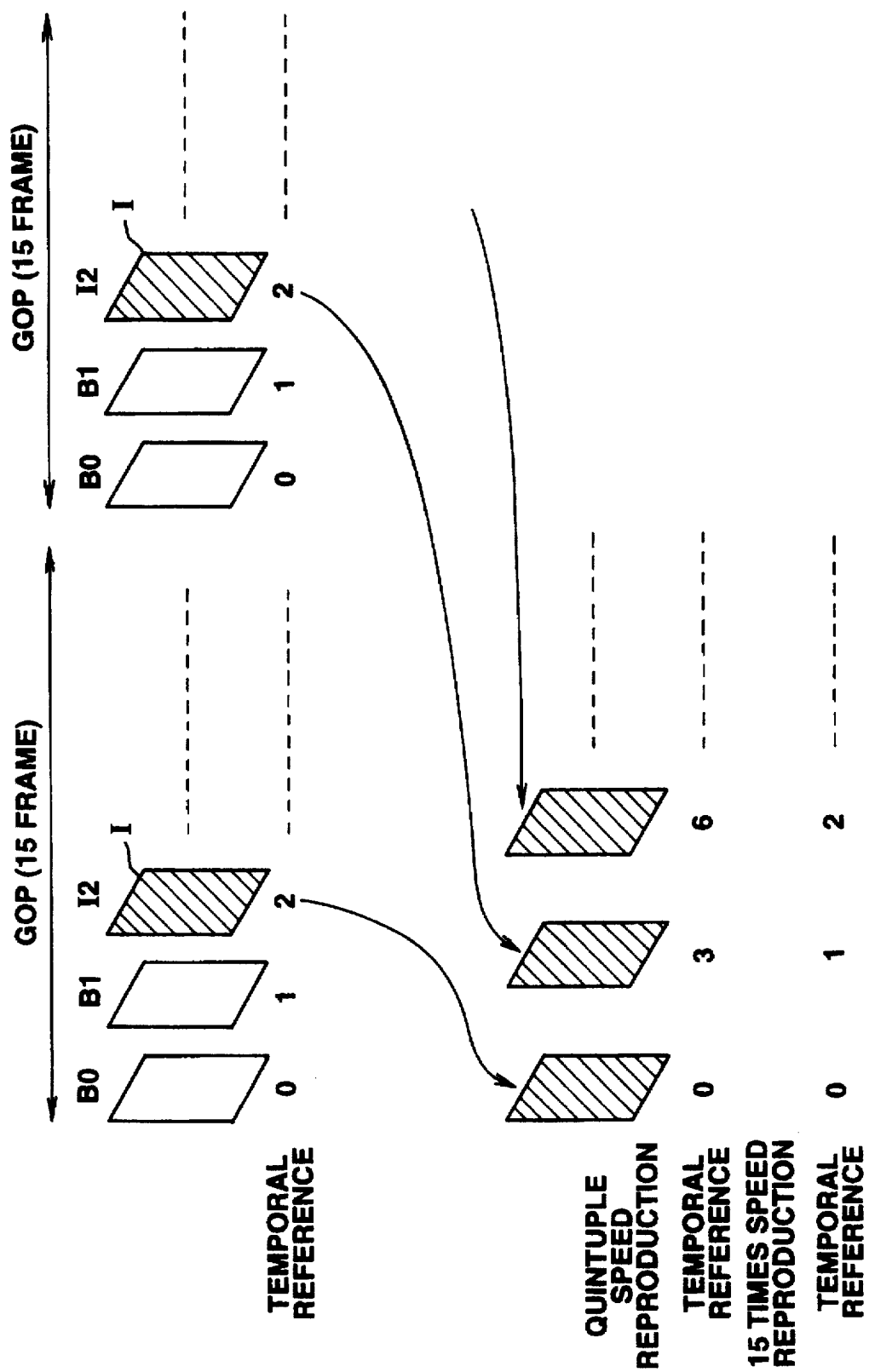
FIG. 8 is a view for explaining the relationship between picture and high speed reproduction.

In the first embodiment of this invention, it is assumed that picture signal reproducing apparatus rewrites temporal_reference at the time of high speed reproduction to output it. This will be described in detail with reference to FIG. 8. FIG. 8 shows the case where GOP consists of 15 frames and I pictures exist at a rate of one frame to 15 frames. In the figure, I pictures are indicated by slanting lines. In the case where such I pictures are reproduced, e.g., at quintuple speed, I pictures are respectively by 3 frames. Accordingly, in this embodiment, temporal_reference is increased (incremented) by 3 as shown in FIG. 8. Similarly, in the case of 15 times speed, temporal_reference is increased (incremented) by 1.

Figure 9:
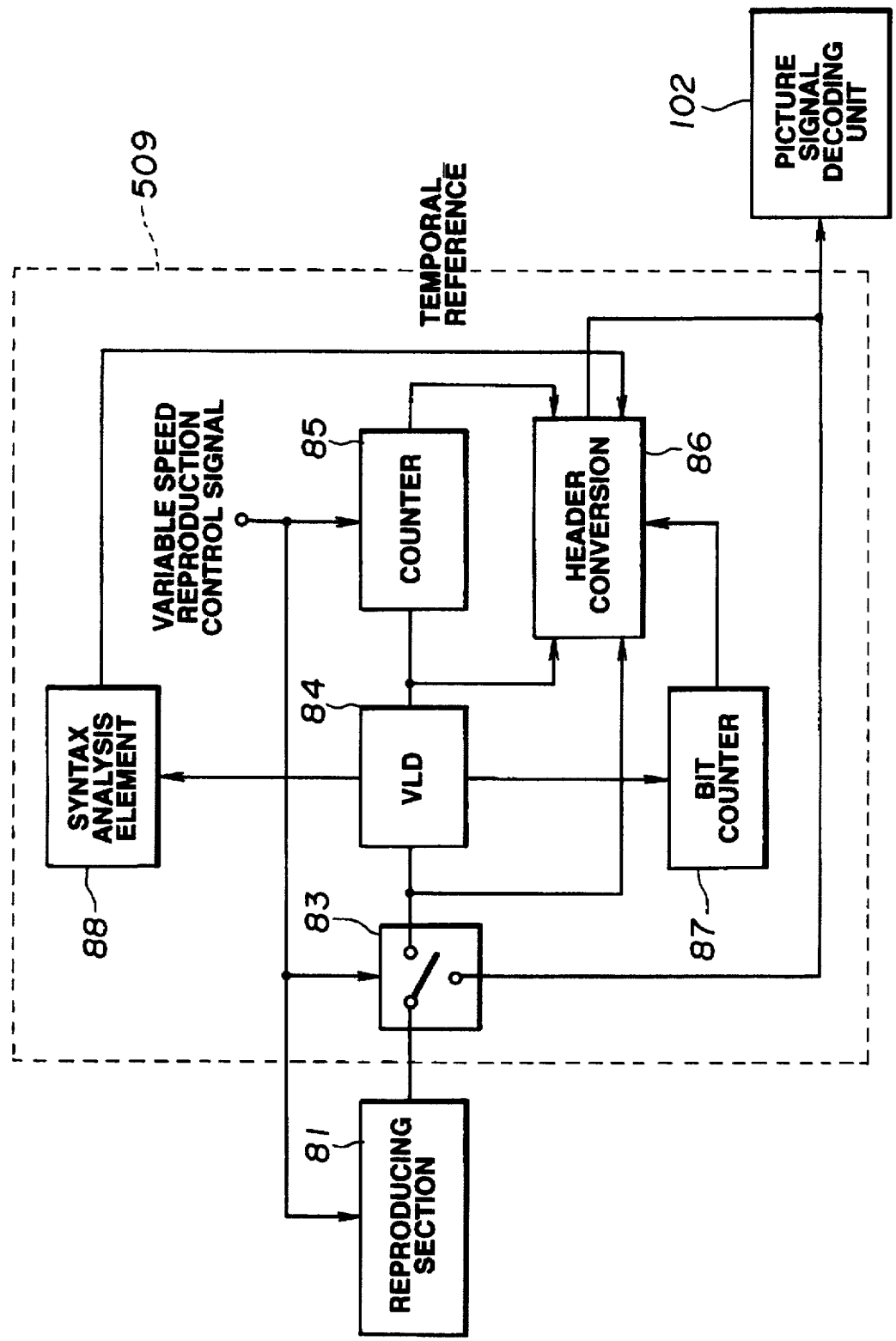
FIG. 9 is a view showing the configuration of picture signal recording apparatus in first embodiment.

Picture signal reproducing apparatus (unit) in the first embodiment is shown in FIG. 9. Reproducing section 81 may be digital VTR 602 shown in FIG. 6, or digital disc unit 500 shown in FIG. 5. At the time of normal reproduction, picture signal which is read out from reproducing section 81 is outputted to picture signal decoding unit 102 as it is. In the case where high speed reproduction is carried out, switch 83 is switched by high speed reproduction control signal inputted from the external. As a result, signal read out from reproducing section 81 is inputted to VLD (IVLC) 84 and header converter 86. High speed reproduction control signal is inputted to reproducing section 81, switch 83 and counter 85. The reproducing section 81 reproduces predetermined data in accordance with high speed reproduction control signal to output reproduced data.

Here, the high speed reproduction control signal is a signal indicating that reproduction mode shifts to high speed reproduction mode and a signal indicating reproduction speed. At VLD (IVLC) 84, variable length encoding of MPEG is released and syntax analysis is carried out. Counter 85 counts the number of frames to be transmitted. Moreover, this counter 85 outputs temporal_reference for rewriting in accordance with reproduction speed indicated by high speed reproduction control signal. Header converter 86 rewrites temporal_reference in picture header in high speed reproduction data delivered from switch 83 in accordance with temporal_reference outputted from counter 85. In this example, signals delivered from VLD 84 to header converter 86 are signals indicating positions of various headers.

VBV will now be described. vbv_delay recorded in picture header indicates timing at which ILVC 402 of decoding unit 102 reads out corresponding picture from buffer 401 at the time of normal reproduction, i.e., buffer occupation ratio of VBV. Since only I picture is read out at the time of high speed reproduction, this vbv_delay does not indicate correct value at the time of high speed reproduction. The following three solving methods exist in order to solve the above-mentioned problem.

The first method is a method of rewriting vbv_delay to output rewritten one. In this case, bit counter 87 adds bit quantity of corresponding picture in syntax analysis by VLD 84, and head converter 86 rewrites vbv_delay from that value. Namely, at the time of reproduction, header converter 86 rewrites vbv_delay into value at the time of high speed reproduction.

The second method is a method of inserting sequence_ start_code (sequence_header) to the leading portions of respective pictures of high speed reproduction data delivered from switch 83, or inserting sequence_end_code to the end potions of respective pictures. This insertion is carried out at header converter 86. Thus, VBV is reset by the leading portion of each picture in picture signal decoding unit 102.

The third method is a method of converting vbv_delay into "3FFFFFFF" at the time of high speed reproduction. In this case, vbv_delay indicates that current rate is variable rate. This conversion is carried out at header converter 86. Thus, VBV is disregarded at the time of decoding in picture signal decoding unit 102.

Even when alteration of VBV is carried out by the first, second or third method in a manner as stated above, in the case where only I pictures are read out, there is the possibility that buffer 401 of decoding unit 102 may underflow. In this case, in order to prevent this, stuffing data are inserted between respective picture data. This is carried out at header converter 86 from bit quantity determined by bit counter 87. This is carried out similarly to VBV control at the time of encoding. Frame of which header is rewritten is outputted to decoding unit 102. This decoding unit 102 carries out decoding similarly to normal reproduction as data in conformity with the MPEG system also with respect to high speed reproduction data.

A second embodiment of this invention will now be described with reference to FIG. 9. In the second embodiment, similarly to the first embodiment, picture signal reproducing unit outputs picture signal in conformity with the MPEG system to picture signal decoding unit 102 in both cases of normal reproduction and high speed reproduction. In this case, picture signal decoding unit 102 carries out decoding similarly to normal reproduction also at the time of high speed reproduction. The second embodiment differs from the first embodiment in that I pictures cannot be completely read out. In the case where read-out speed of reproducing section 81 is not sufficient, it is unable to read out all data of I pictures at the time of high speed reproduction. In this case, only one portion of I picture will be outputted at the time of high speed reproduction.

Figure 10:
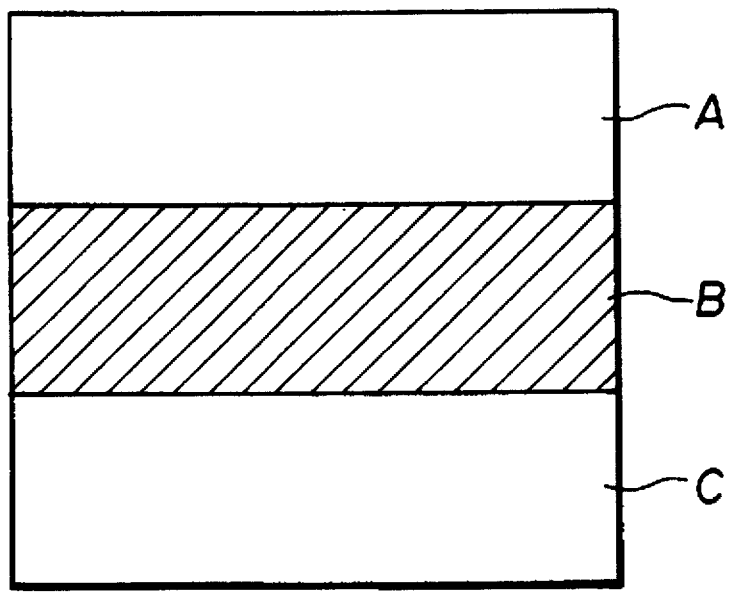
FIG. 10 is a view for explaining imperfect I picture.

An example of imperfect (incomplete) I picture is shown in FIG. 10. At the time of high speed reproduction, data of B portion of I picture in the figure is read out and is decoded, and only portion of intra-data of frame displayed at time earlier by one frame is then changed (altered). Namely, in decoding unit 102, with respect to the portions where no data exists, e.g., A, C in the figure, data of previous frame stored in frame memory 416 or 417 of FIG. 3 is copied and is used. The problem in this case is that gap of slice is not allowed in addition to the problem in the case of the first embodiment. The fact that "gap of slice is not allowed" indicates that in the case where only intra-data B of a portion at the center of frame in the figure is read out, no data exists at the portions of A and C in frame. In such a case, there results the state where matching of data is not established in longitudinal direction in the figure. This state is called the state where there is gap of slice.

With respect to such extraordinary frame, various method of measure at the decoder side are conceivable. However, in order to maintain compatibility, e.g., in the MPEG standard, it is prohibited that there results such a state. In order to allow it to be in conformity with the MPEG system, it is necessary to insert data such that it is in conformity with the MPEG system into the portions where no data exists, i.e., the portions of A and C in the figure to suffice the MPEG system.

Figure 11A:
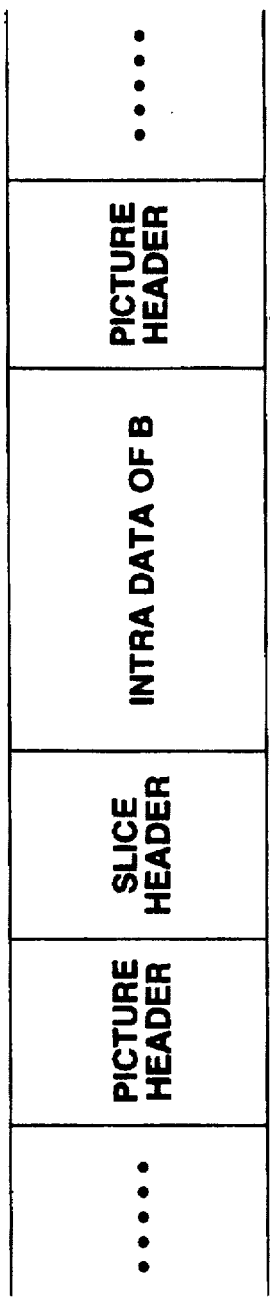
FIG. 11 is a view showing, in a model form, bit stream.
Figure 11B:
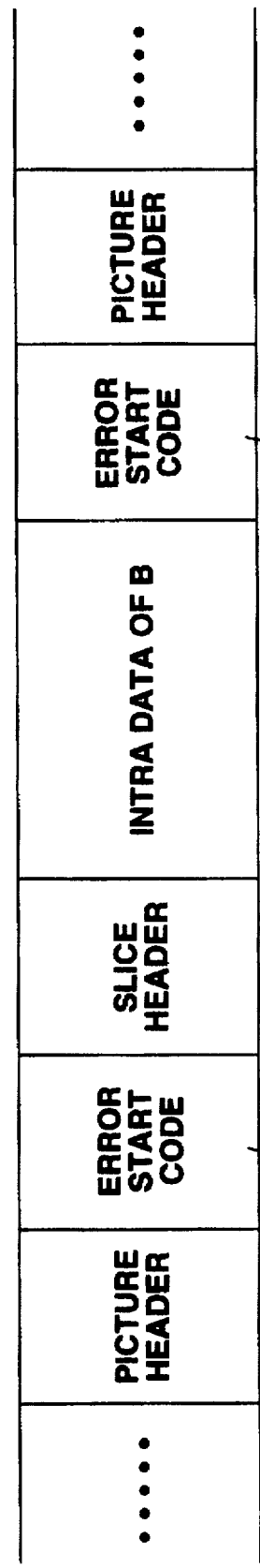

FIG. 11 shows, in a model form, bit stream.

Since any processing is not implemented to bit stream of (a), gaps exist in slice. For this reason, there does not result data in conformity with the MPEG system. In view of this, in correspondence with the portions of A and C of FIG. 10, data indicating that no data exists are added. Bit stream in the case where such a processing is carried out is shown in (b) of FIG. 11.

For this processing, there are two methods. The first method will be described below. In the case where after picture header is transmitted, it is judged by syntax analysis element 88 that predetermined data does not exists, predetermined error_start_code (sequence_error_code) prescribed by syntax of MPEG is inserted into the portion or portions where no data exists at header converter 86. With respect to the portion or portions where data exists, in accordance with syntax of MPEG, slice data is transmitted. Decoding unit 102 retrieves the next start code when error_start_code is detected at the time of decoding at error start code detector 418 shown in FIG. 3 to start decode operation from that start code. Since slice header has start code, in this case, after error_start_code is detected, such slice comprised of intra data is first decoded. The portion where error_start_code is detected is copied from the same portion of the previous frame stored in frame memory 416 or 417.

The second method will now be described. In the second method, it is assumed that the portions where no data exists are all caused to be skip macro block. In this case, since no skip macro block exists in I picture, header converter 86 rewrites picture_coding_type into P picture. Moreover, header converter 86 rewrites all variable length coding codes into variable length coding code in P picture. Further, since it is not allowed that data dose not exist at the leading and end macro blocks of slice, macro block types of the leading and end macro blocks of slice where no data exists are caused to be Non-Intra, Not-coded. With respect to macro block type in this case, only macroblock_motion_forward is 1. Namely, VLC code becomes "001"

Figure 4:
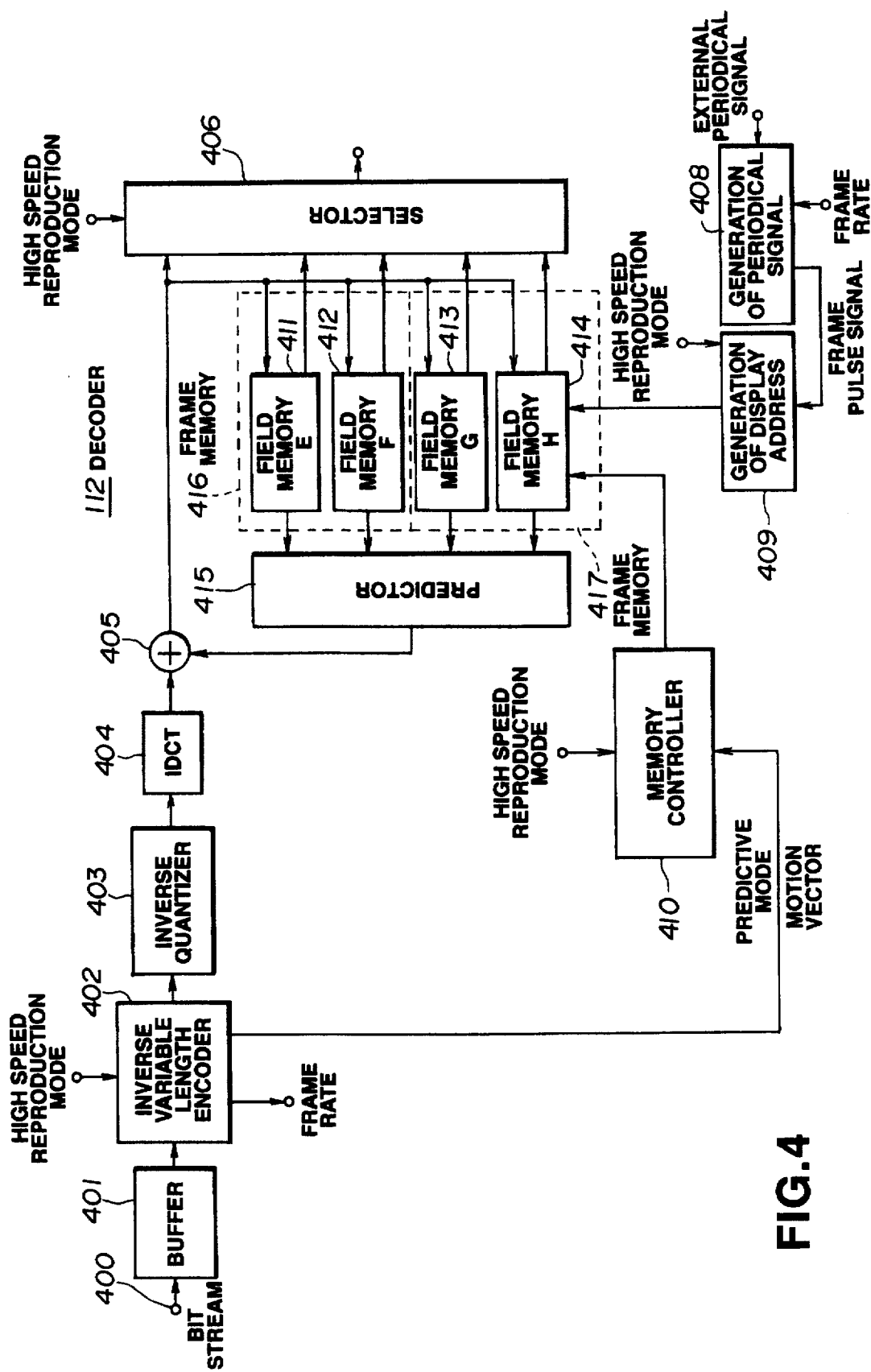
FIG. 4 is another example of the configuration of picture signal decoding apparatus.

A third embodiment of this invention will now be described with reference to FIG. 4. The third embodiment is directed to the case where picture header can be read out also at the time of high speed reproduction. In the third embodiment, unlike the first and second embodiments, picture signal decoding unit 112 decodes picture signal in a mode different from that of normal reproduction at the time of high speed reproduction. Explanation will be given in connection with the high speed reproduction mode. At the time of high speed reproduction, VBV is disregarded. In the case where only intra data is transmitted, there is the possibility that buffer 401 of picture signal decoding unit 112 may overflow or underflow. In this case, decoding unit 112 disregards this to decode only decodable data. Namely, inverse variable length encoder (variable length decoder) 402 carries out an operation to read out the next data from buffer 401 after decode operation is completed independently of vbv_delay. At the time of high speed reproduction, temporal_reference is disregarded. In addition, it is allowed that any gap between slices exists.

In the case where picture signal reproducing unit shifts to high speed reproduction mode by high speed reproduction control signal, it is necessary to transmit, to picture signal decoding unit 112, a signal indicating that picture signal of high speed reproduction mode is transmitted. For such transmitting method, there are two methods. These methods will now be described with reference to FIG. 12.

Figure 12A:
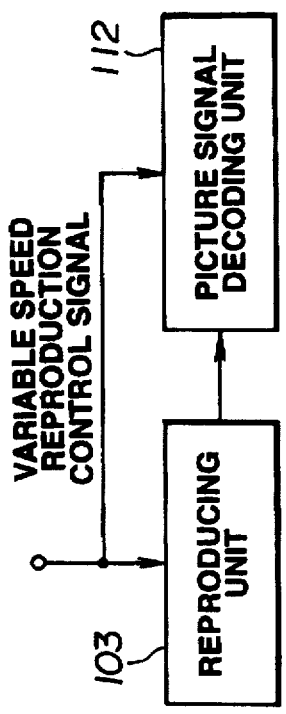
FIG. 12 is a block diagram of system configuration by first and second transition methods.

Initially, the first mode transition method will be described. (a) of FIG. 12 shows an example of system configuration by the first transition method. In the first mode transition method, control signal is inputted to picture signal decoding unit 112 separately from video bit stream of MPEG. This signal is inputted from the external, and high speed reproduction control signal inputted to reproducing unit 103 is also inputted to picture signal decoding unit 112. In this case, reproducing unit 103 may be digital VTR 602 shown in FIG. 6, or may be digital disc unit 500 shown in FIG. 5.

The second mode transition method will now be described. The second mode transition method is a method of writing, into bit stream of MPEG, flag indicating that high speed reproduction data is transmitted. In accordance with this method, flag ff_sequence is recorded into sequence header at the picture signal encoding unit 101. The example where ff_sequence of 1 bit is applied is shown in FIG. 13. It is now assumed that in the case where ff_sequence is "0", that transmit data indicates picture signal of normal reproduction mode. It is further assumed that in the case where ff_sequence is "1", that transmit data indicates picture signal of high speed reproduction mode. When recorded onto recording medium, this ff_sequence is recorded in the state set to "0".

(b) of FIG. 12 shows an example of picture signal reproducing unit by the second transition method. Let first consider the case where picture data is read out from reproducing unit 113 in normal reproduction mode to transmit it to picture signal decoding unit 112 through switch 118.

In this case, sequence header is first read out and parameters of picture signal decoding unit 112 are reset. In this case, in accordance with respective flags recorded in sequence header, picture signal decoding unit 112 decodes transmit data. At this time, respective parameter values of sequence header are also recorded into register 115. Also in normal reproduction mode, every time sequence header is read out, picture signal decoding unit 112 undergoes a processing such that parameters are reset in accordance with flag in sequence header. Further, at this time, respective parameter values recorded in sequence header are recorded into register 115. These parameter values are caused to undergo syntax analysis by VLD 116, and header information is then recorded into register 115. In addition, header information, particularly sequence header is read out also at the time of high speed reproduction, and is recorded into register 115. Thus, also at the time of high speed reproduction, respective parameters are always set to parameter values used when corresponding frame is decoded.

Figure 14:
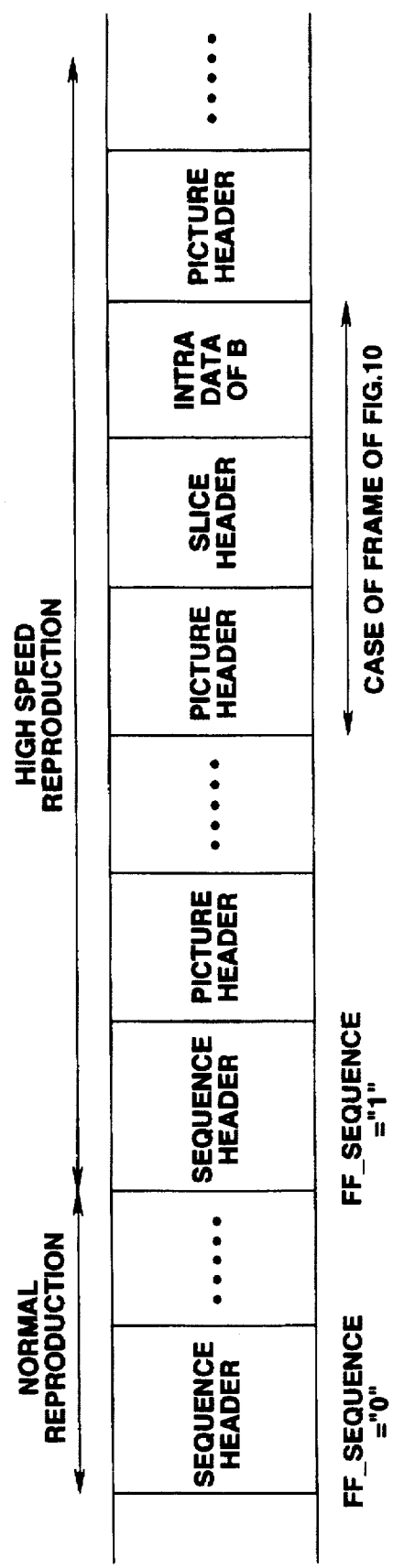
FIG. 14 is a view showing the configuration of bit stream.

In the case of carrying out transition from normal reproduction to high speed reproduction, sequence header is transmitted through formatter 117 and switch 118 for a second time, and picture data at the time of high speed reproduction is then transmitted. Sequence header in this case will now be described. In the case where reproduction mode (operation) shifts from normal reproduction to high speed reproduction, value of flag of sequence header immediately before is recorded in advance into register 115. This value of flag is recorded into sequence header first transmitted after reproduction mode (operation) shifts to high speed reproduction. It should be noted that formatter 117 sets ff_sequence of sequence header which has been read out from register 115 to "1". Moreover, also at the time of high speed reproduction, in the case where sequence header is read out, value of flag of that sequence header is recorded into register 115. In such recording, since ff_sequence of sequence header delivered from picture signal recording unit 113 is set to "0", ff_sequence is rewritten into "1". Further, as other flags, values recorded in register 115 are used. These operations therefor are carried out by formatter 117. The formatter converts a current system into a predetermined system at the time of high speed reproduction. In this case, bit stream is constituted as shown in FIG. 14. Inverse variable length encoder 402 of decoding unit 112 detects ff_sequence to designate (inform), when that ff_sequence is "1", respective blocks of decoding unit 112 that reproduction mode is high speed reproduction mode.

Data which is read out will now be described. The third embodiment is directed to the case where picture header can be read also at the time of high speed reproduction. With respect to the case where picture header can be read, there exist two kinds of cases described below. Namely, there are the case where data of all macro blocks of I picture can be read, and the case where only a portion of macro blocks of I picture, i.e., a portion of slices can be read.

As for high speed reproduction, in high speed reproduction of relatively low speed, e.g., the order of double speed, there are instances where all macro blocks of I picture can be read. In this case, picture signal decoding unit 112 disregards temporal_reference to carry out decoding to output decode picture stored in frame memory 416 or 417 as soon as decode operation is completed. Then, picture signal decoding unit 112 outputs the same picture until decode operation of the next I picture is completed. In this reproduction, only I picture complete as picture is displayed at all times.

On the other hand, as for high speed reproduction, in high speed reproduction of relative high speed, e.g., the order of 10 times speed, only a portion of slices of I picture can be read out. In this case, picture signal recording unit does not insert slice data into the portion where no data exists unlike the second embodiment. Picture signal decoding unit 112 allows existence of gap or gaps between slices to decode only the portion where data exists to update decoded partial slice into frame outputted at time earlier by one frame to output it. In the case where a certain displayable slice is read out, absolute address of the leading macro block of slice can be determined as follows. It should be noted that absolute address is 0 at the left and upper portion of picture. The last 8 bits of slice header indicates vertical position of the leading macro block within slice (slice_vertical_position).

At the leading portion of slice, previous_macroblock_ address is reset by the following expression.

previous_macroblock_address=(slice_vertical_position−1)*mb_width−1

Namely, this is address of macro block at the left end of row where the leading macro block of corresponding slice exists. By adding macroblock_address_increment recorded in macro block to that address, it is possible to recognize absolute address of the leading macro block within slice.

Thus, with respect to picture currently displayed, slice to be updated next can be discriminated as absolute address. In this way, memory controller 410 determines absolute address of slice to be updated on the basis of slice_vertical_ position from inverse variable length encoder 402 to control write addresses of frame memories 416 and 417. Namely, in picture signal decoding unit 112, decoded slice data is written into frame memory. In the case where such data is written into frame memory, there are two writing methods described below.

In the first writing method, frame memory corresponding to one frame, i.e., any one of frame memories 416 and 417 is used. Decoded data of slice is directly overwritten from its absolute address into the frame memory in which picture previously outputted is written. In output, data of the frame memory is used at all times.

In the second writing method, frame memory corresponding to 2 frames, i.e., both frame memories 418 and 417 are used. Decoded data of slice is written into frame memory different from frame memory in which picture previously outputted is written. With respect to macro block in which no data has been transmitted, data of the same macro block is copied from the other frame memory. Thus, pictures are updated by slices which have been read out.

A fourth embodiment of this invention will now be described.

Similarly to the third embodiment, at the time of high speed reproduction, the fourth embodiment carries out reproduction in a mode different from normal reproduction. The method of transition between normal reproduction mode and high speed reproduction mode is similar to that of the third embodiment. The fourth embodiment is directed to the case where picture header cannot be decoded or transmitted. In this case, it is necessary to record flag existing in picture header and necessary for decode into slice header to transmit it. In decoding, flag necessary as minimum as possible for inverse variable length encoding is picture_ coding_type, intra_dc_precision, picture_structure, q_scale_type, intra_vlc_format, alternate_scan. Moreover, in order to improve picture quality, it is necessary to transmit quantizer_matrix recorded in sequence header.

Figure 12B:
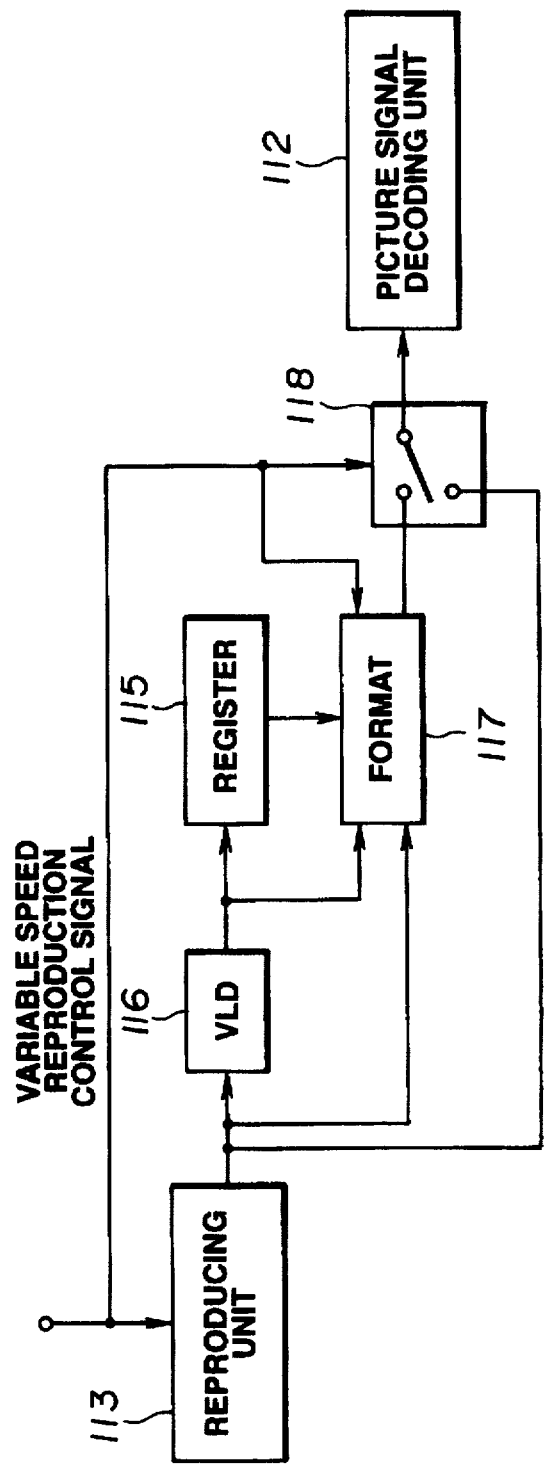

An example of slice header at the time of high speed reproduction is shown in FIG. 15. slice_type is flag indicating that corresponding slice consists of intra macro blocks. The case of "1" indicates that corresponding slice consists of intra macro blocks. The case of "0" indicates that slice includes inter-frame coded macro block (inter-macro block). picture_coding_type, intra_dc_precision, picture_structure, q_scale_type, intra_vlc_format, alternate_scan are similar to those of picture header. FIG. 15 shows the embodiment where quantizer_matrix is not transmitted. Such quantizer_matrix may be transmitted. Moreover, in the case where quantizer_matrix is not transmitted, default matrix is used. Such flag is added to slice header at the time of coding at encoding unit 102, and is recorded onto recording medium. In this case, picture header information added by VLC 306 at encoding unit 102 is recorded into register 319. In transmitting slice header, VLC 306 writes header information recorded in register into respective slice headers. In normal reproduction, since the above-described flag is redundant, there is no necessity of decoding it. In addition, a configuration as shown in FIG. 12(b) may be used in place of carrying out processing at the encoding unit side to allow reproduced data to undergo inverse variable length encoding by VLD 116 before inputted to decoding unit 112 to once (temporarily) store picture header thus obtained into register 115 to write it at position of slice header by formatter 117.

High speed reproduction mode in the fourth embodiment will now be described. High speed reproduction mode in the fourth embodiment is similar to that of the third embodiment, but carries out decode operation by using flag recorded in slice header also in the case where picture header is unable to be reproduced. Absolute address of slice which has been read out is obtained similarly to the third embodiment. Moreover, since no picture header exists, timing of display after decoding is determined by decoding unit 112. Namely, data in which decoding is completed is always written into the same frame memory, i.e., one of frame memories 416 and 417, and this frame memory is used to display decoded data every time prescribed in frame_rate at timing independent of that at the time of decoding. In accordance with this decoding method, since pictures always exist in frame memory, also in the case where all decoding (overwriting) operations of picture data of intra macro blocks, which are inputted to decoder at the time of high speed reproduction, are not completed, if the content of this frame memory is displayed, it is possible to display picture free from sense of incompatibility. In this case, picture data of the remaining intra macro blocks are caused to undergo decoding irrespective of timing of display, and are displayed at the next display timing.

As described above, in accordance with this invention, also at the time of high speed reproduction, signal in conformity with the MPEG standard is inputted to decoding unit, or signal indicating that reproduction mode shifts to special reproduction is inputted to picture signal decoding unit to transmit flag necessary for special reproduction, thereby making it possible to realize special reproduction such as high speed reproduction, etc. In addition, from facts described above, only TV or HDTV monitor is caused to have picture signal decoding unit, and various picture signal recording units, e.g., digital VTR, digital video disc, or computer are not therefore required to have picture signal decoding unit, thus advantageously permitting unnecessary circuits to be eliminated.

What is claimed is:

1. A decoding method for decoding a reproduced signal reproduced from a recording medium storing a coded signal encoded according to an MPEG-type encoding methodology, said decoding method comprising the steps of:

reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology;

revising said second signal portion to produce a revised signal which is in synchronization with said high-speed reproduction operation; and decoding said revised signal according to an MPEG-type decoding methodology.

2. A decoding method for decoding a reproduced signal reproduced from a recording medium storing a coded signal encoded according to an MPEG-type encoding methodology, said decoding method comprising the steps of:

reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology;

adding a format data to said second signal portion to produce a revised signal conforming with said MPEG-type encoding methodology; and decoding said revised signal according to an MPEG-type decoding methodology.

3. A decoding method as set forth in claim 2, wherein said first signal portion at least includes an intra-coded picture signal, and wherein said second signal portion comprises header information.

4. A decoding method as set forth in claim 1, wherein said second signal portion includes temporal_reference data and wherein said step of revising includes the step of revising said temporal_reference data in said second signal portion.

5. A decoding method as set forth in claim 1, wherein said second signal portion includes vbv_delay data, and wherein said step of revising includes the step of revising said vbv_delay data in said second signal portion with a value corresponding to a bit quantity of said reproduced signal.

6. A decoding method as set forth in claim 2, wherein reproduced signal includes predetermined coding units and wherein said step of adding includes the step of inserting a sequence_start_code data and a sequence_end_code data at a plurality of said predetermined coding units in said reproduced signal.

7. A decoding method as set forth in claim 1, wherein said second signal portion includes vbv_delay data, and wherein said step of revising includes the step of revising said vbv_delay data in said second signal portion with a value indicating a variable rate.

8. A decoding method as set forth in claim 1, further comprising the step of inserting stuffing data into said reproduced signal.

9. A decoding method as set forth in claim 2,
further comprising the step of:
determining that said second signal portion does not conform with said MPEG-type encoding methodology, and wherein said step of adding includes the step of inserting a sequence_error_code data into said second signal portion.

10. A decoding method as set forth in claim 2,
further comprising the steps of:
determining that said second signal portion does not conform with said MPEG-type encoding methodology; and processing, as at least one skip macro block, said second signal portion.

11. A decoding method as set forth in claim 2, wherein said first signal portion includes at least an intra-coded picture signal, and wherein said second signal portion comprises header information.

12. A decoding method for decoding a reproduced signal reproduced from a recording medium storing a coded signal encoded according to an MPEG-type encoding methodology, said decoding method comprising the steps of:
   reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology; and
   decoding said reproduced signal according to an MPEG-type decoding methodology by disregarding at least one data condition required according to said MPEG-type decoding methodology.

13. A decoding method as set forth in claim 12, wherein said second signal portion includes vbv_delay data and temporal_reference data, and wherein said step of decoding includes the step of disregarding said vbv_delay data and said temporal_reference data.

14. A decoding method as set forth in claim 13, wherein an already decoded picture is outputted as a display picture until a next picture is decoded.

15. A decoding method as set forth in claim 12,
   wherein said first signal portion includes slice_vertical_position data, and wherein said step of decoding includes
   the step of
   decoding said second signal portion in accordance with said slice_vertical_position data included in said first signal portion.

16. A decoding method as set forth in claim 15, further comprising the step of filling at least one slice gap in a second display picture displaying a decoded version of said second signal portion with a picture data outputted previously as a first display picture.

17. A decoding method as set forth in claim 12,
   wherein said first signal portion includes sequence header data, and wherein said step of decoding further comprises the step of
   switching between decoding in accordance with said MPEG-type decoding methodology and decoding in accordance with said MPEG-type decoding methodology modified by disregarding at least one required data condition, as a function of a special reproduction flag inserted in said sequence header data.

18. A decoding method as set forth in claim 12,
   wherein said second signal portion includes slice units, each slice unit containing slice header data, and wherein said step of decoding further comprises the steps of
   adding, to said slice header data, one of said picture header data and a sequence header data necessary for decoding said slice unit of said reproduced signal; and
   decoding said second signal portion as a function of said added data.

19. A decoding apparatus for decoding a reproduced signal reproduced from a recording medium storing a coded signal encoded according to an MPEG-type encoding methodology, said apparatus comprises:
   reproducing means for reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology;
   revising means for revising said second signal portion to produce a revised signal which is in synchronization with said high-speed reproduction operation; and
   decoding means for decoding said revised signal according to an MPEG-type decoding methodology.

20. A decoding apparatus as set forth in claim 19, wherein said first signal portion includes at least an intra-coded picture signal, and wherein said second signal portion comprises header information.

21. A decoding apparatus for decoding a reproduced signal reproduced from a recording medium storing a coded signal encoded according to an MPEG-type encoding methodology, said decoding apparatus comprises:
   reproducing means for reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology;
   adding means for adding a format data to said second signal portion to produce a revised signal conforming with said MPEG-type encoding methodology; and
   decoding means for decoding said revised signal according to an MPEG-type decoding methodology.

22. A decoding apparatus as set forth in claim 21, wherein said first signal portion at least includes an intra-coded picture signal, and wherein said second signal portion comprises header information.

23. A decoding apparatus as set forth in claim 19, wherein said second signal portion includes temporal_reference data and wherein said revising means comprises
   means for revising said temporal_reference data in said second signal portion.

24. A decoding apparatus as set forth in claim 19, wherein said second signal portion includes vbv_delay data, and wherein said revising means comprises means for revising said vbv_delay data in said second signal portion with a value corresponding to a bit quantity of said reproduced signal.

25. A decoding apparatus as set forth in claim 21, wherein said reproduced signal includes predetermined coding units and wherein said adding means comprises inserting means for inserting a sequence_start_code data and a sequence_end_code data at a plurality of said predetermined coding units in said reproduced signal.

26. A decoding apparatus as set forth in claim 19, wherein said second signal portion includes vbv_delay data, and wherein said revising means comprises means for revising said vbv_delay data in said second signal portion with a value indicating a variable rate.

27. A decoding apparatus as set forth in claim 19, further comprising inserting means for inserting stuffing data into said reproduced signal.

28. A decoding apparatus as set forth in claim 21, further comprising:
   determining means for determining that said second signal portion does not conform with said MPEG-type encoding methodology, and wherein said adding means comprises inserting means for inserting a sequence_error_code data into said second signal portion.

29. A decoding apparatus as set forth in claim 21, further comprising determining means for determining that said second signal portion does not conform with said MPEG-type encoding methodology, and wherein said decoding means comprises means for processing, as at least one skip macro block, said second signal portion.

30. A decoding apparatus for decoding a reproduced signal reproduced from a recording medium storing a coded signal encoded according to an MPEG-type encoding methodology, said decoding apparatus comprises:

reproducing means for reproducing, in a high-speed reproduction operation, from said recording medium said coded signal to produce said reproduced signal, wherein said reproduced signal comprises a first signal portion conforming with said MPEG-type encoding methodology and a second signal portion not conforming with said MPEG-type encoding methodology; and decoding means for decoding said reproduced signal according to an MPEG-type decoding methodology by disregarding at least one data condition required according to said MPEG-type decoding methodology.

31. A decoding apparatus as set forth in claim 30, wherein said second signal portion includes vbv_delay data and temporal_reference data, and wherein said decoding means comprises means for disregarding said vbv_delay data and said temporal_reference data.

32. A decoding apparatus as set forth in claim 31, wherein said decoding means outputs, as a display picture, an already decoded picture until a next picture is decoded.

33. A decoding apparatus as set forth in claim 30, wherein said first signal portion includes slice vertical position data, and wherein said decoding means comprises means for decoding said second signal portion in accordance with said slice_vertical_position data included in said first signal portion.

34. A decoding apparatus as set forth in claim 33, wherein said decoding means comprises means for filling at least one slice gap in a second display picture displaying a decoded version of said second signal portion with a picture data outputted previously as a first display picture.

35. A decoding apparatus as set forth in claim 30, wherein said first signal portion includes sequence header data, and wherein said decoding means comprises means for switching between decoding in accordance with said MPEG-type decoding methodology and decoding in accordance with said MPEG-type decoding methodology modified by disregarding at least one required data condition, as a function of a special reproduction flag inserted in said sequence header data.

36. A decoding apparatus as set forth in claim 30, wherein said second signal portion includes slice units, each slice unit containing slice header data;

wherein said decoding means comprises:

adding means for adding, to said slice header data, one of said picture header data and a sequence header data necessary for decoding said slice unit of said reproduced signal; and means for decoding said second signal portion as a function of said added data.

* * * * *